US012812182B2

(12) United States Patent
Rusanovskyy et al.

(10) Patent No.: US 12,812,182 B2
(45) Date of Patent: Nov. 24, 2026

(54) NEURAL NETWORK BASED IN LOOP FILTER ARCHITECTURE WITH UNIFIED SUPPLEMENTARY DATA PROCESSING FOR VIDEO CODING

(71) Applicant: QUALCOMM Incorporated, San Diego, CA (US)

(72) Inventors: Dmytro Rusanovskyy, San Diego, CA (US); Yun Li, Ottobrunn (DE); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 18/742,216

(22) Filed: Jun. 13, 2024

(65) Prior Publication Data

US 2024/0422361 A1 Dec. 19, 2024

Related U.S. Application Data

(60) Provisional application No. 63/508,237, filed on Jun. 14, 2023.

(51) Int. Cl.

| | |
|---|---|
| ***H04N 19/86*** | (2014.01) |
| ***H04N 19/117*** | (2014.01) |
| ***H04N 19/167*** | (2014.01) |
| ***H04N 19/172*** | (2014.01) |
| ***H04N 19/44*** | (2014.01) |

(52) U.S. Cl.

CPC ........... *H04N 19/86* (2014.11); *H04N 19/117* (2014.11); *H04N 19/167* (2014.11); *H04N 19/172* (2014.11); *H04N 19/44* (2014.11)

(58) Field of Classification Search

CPC ............................ H04N 19/86; H04N 19/117

See application file for complete search history.

(56) References Cited

U.S. PATENT DOCUMENTS

| | | | | |
|---|---|---|---|---|
| 2020/0213587 | A1* | 7/2020 | Galpin | G06N 3/08 |
| 2021/0368211 | A1* | 11/2021 | Wan | H04N 19/186 |
| 2022/0109860 | A1* | 4/2022 | Chen | H04N 19/82 |

OTHER PUBLICATIONS

Alshina E, (Huawei)., et al., "BoG Report on NN-Filter Design Unification", 30th Meeting, Antalya, TR, Apr. 21, 2023-Apr. 28, 2023, (The Joint Video Exploration Team of ISO/IEC JTC1/SC29/WG11 and ITU-T SG.16 ), No. JVET-AD0380-v7, m63478, Apr. 27, 2023, XP030309266, Second Tab of the Attached Excel File, Called EE1-1 p. 2, Apr. 2023, Paragraph First, 12 Pages.

International Search Report and Written Opinion—PCT/US2024/034056—ISA/EPO—Oct. 2, 2024 15 Pages.

(Continued)

*Primary Examiner* — Kyle M Lotfi

(74) *Attorney, Agent, or Firm* — Shumaker & Sieffert, P. A.

(57) ABSTRACT

An example device for decoding video data includes: a memory configured to store video data; and a processing system comprising one or more processors implemented in circuitry, the processing system being configured to: decode at least a portion of a picture of video data; combine two or more sets of supplementary data for the at least portion of the picture into a single set of supplementary data; and execute a neural network filter, using the at least portion of the picture and the single set of supplementary data as inputs to the neural network filter, to filter the at least portion of the picture.

16 Claims, 28 Drawing Sheets

(56) References Cited

OTHER PUBLICATIONS

Wennersten P, (Ericsson) et al., "EE1-1.4 Channel Redistribution For Luma and Chroma", 30th Meeting, Antalya, TR, Apr. 21, 2023-Apr. 28, 2023, (The Joint Video Exploration Team of ISO/IEC JTC1/SC29/WG11 and ITU-T SG.16 WP3), No. JVET-AD0168-v2, m62833, Apr. 27, 2023, XP030308885, Section 1, Section 2.1, Figure 1, 12 Pages.
Alshina E., et al., "Exploration Experiments on Neural Network-based Video Coding (EE1)", JVET-AD2023-v2, Joint Video Experts Team (JVET) of ITU-T SG 16 WP 3 and ISO/IEC JTC 1/SC 29 30th Meeting, Antalya, TR, Apr. 21-28, 2023, pp. 1-12.
Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11 19th Meeting: by teleconference, Jun. 22-Jul. 1, 2020, 551 Pages.
Chang R., et al., "EE1-1.1: More Refinements on NN Based in-Loop Filter with a Single Model", JVET-AC0194-v1, Joint Video Experts Team (JVET) of ITU-T SG 16 WP 3 and ISO/IEC JTC 1/SC 29 29th Meeting, by teleconference, Jan. 11-20, 2023, pp. 1-7.
Dumas T., et al., "EE1-3.2: Neural Network-based Intra Prediction with Learned Mapping to VVC Intra Prediction Modes", JVET-AC0116-v1, Joint Video Experts Team (JVET) of ITU-T SG 16 WP 3 and ISO/IEC JTC 1/SC 2929th Meeting, by Teleconference, Jan. 11-20, 2023, pp. 1-5.
Eadie S., et al., "EE1-1.9: Reduced Complexity CNN-Based In-loop Filtering", JVET-AC0155-v1, Joint Video Experts Team (JVET) of ITU-T SG 16 WP 3 and ISO/IEC JTC 1/SC 29 29th Meeting, by teleconference, Jan. 11-21, 2023, pp. 1-4.
ITU-T H.265: "Series H: Audiovisual and Multimedia Systems Infrastructure of Audiovisual Services—Coding of Moving Video", High Efficiency Video Coding, the International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, the International Telecommunication Union, Aug. 2020, 516 pages.
Jia J., et al., "AHG11: Deep Reference Frame Generation for Inter Prediction Enhancement", JVET-AB0114-v2, Joint Video Experts Team (JVET) of ITU-T SG 16 WP 3 and ISO/IEC JTC 1/SC 29/WG 11 28th Meeting, Mainz, DE, Oct. 20-28, 2022, pp. 1-6.
Lebedev V., et al., "Speeding-up Convolutional Neural Networks Using Fine-tuned CP-Decomposition", arXiv:1412.6553v3 [cs.CV] Apr. 24, 2015, pp. 1-11.
Li Y., et al., "EE1-1.7: Combined Test of EE1-1.6 and EE1-1.3", JVET-Z0113-v2, Joint Video Experts Team (JVET) of ITU-T SG 16 WP 3 and ISO/IEC JTC 1/SC 29, 26th Meeting, by Teleconference, Apr. 20-29, 2022, 7 Pages.
Li Y., et al., "EE1-related: In-Loop Filter with Wide Activation and Large Receptive Field", JVET-AC0178-v1, Joint Video Experts Team (JVET) of ITU-T SG 16 WP 3 and ISO/IEC JTC 1/SC 29 29th Meeting, by teleconference, Jan. 11-20, 2023, pp. 1-6.
Santamaria M, et al., "EE1-1.11: Content-adaptive Post-filter", JVET-AC0055-v2, Joint Video Experts Team (JVET) of ITU-T SG 16 WP 3 and ISO/IEC JTC 1/SC 29 29th Meeting, by teleconference, Jan. 11-20, 2023, pp. 1-7.
Seregin V., et al., "EE2: Summary Report on Enhanced Compression beyond VVC Capability", JVET-AD0023-v1, Joint Video Experts Team (JVET) of ITU-T SG 16 WP 3 and ISO/IEC JTC 1/SC 29, 30th Meeting, Antalya, TR, Apr. 21-28, 2023, pp. 1-35.
Wang H., et al., "EE1-1.4: Test on Neural Network-Based In-Loop Filter with Large Activation Layer", JVET-V0115-v3, Joint Video Experts Team (JVET) of ITU-T SG 16 WP 3 and ISO/IEC JTC 1/SC 29, 22nd Meeting, by teleconference, Apr. 20-28, 2021, pp. 1-6.
Wang L., et al., "EE1-1.2: Neural Network Based In-loop Filter with a Single Model", JVET-Z0091-v4, Joint Video Experts Team (JVET) of ITU-T SG 16 WP 3 and ISO/IEC JTC 1/SC 29, 26th Meeting, by teleconference, Apr. 20-29, 2022, 7 Pages.

* cited by examiner

NEURAL NETWORK BASED IN LOOP FILTER ARCHITECTURE WITH UNIFIED SUPPLEMENTARY DATA PROCESSING FOR VIDEO CODING

This application claims the benefit of U.S. Provisional Application No. 63/508,237, filed Jun. 14, 2023, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to neural network-based video coding tools, including techniques for reducing computational complexity and memory bandwidth requirements of such tools. Certain techniques of this disclosure generally relate to neural network-assisted loop filtering. However, these techniques may be applicable to any neural network-based video coding tool that consumes input data with certain statistical properties. Techniques of this disclosure may be used in the context of various video codecs, e.g., advanced video codecs, such as extension to ITU-T H.266/Versatile Video Coding (VVC) or other next generation video coding standards, or other codecs.

The techniques of this disclosure may reduce computation complexity and memory bandwidth requirements for neural network-based filtering. Alternatively, computational complexity budget being freed by these techniques can be utilized to increase a number of processed features, or process blocks, thus achieving higher filter performance under constrained complexity (kMAC/pixel).

In one example, a method of decoding video data includes: decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture. The supplementary data may be, for example, boundary strength data, quantization parameter data (e.g., a base QP value and/or a slice QP value), an I-, P-, B-picture structure for the data, or the like.

In another example, a device for decoding video data includes: a memory configured to store video data; and a processing system comprising one or more processors implemented in circuitry, the processing system being configured to: decode at least a portion of a picture of video data; combine two or more sets of supplementary data for the at least portion of the picture into a single set of supplementary data; and execute a neural network filter, using the at least portion of the picture and the single set of supplementary data as inputs to the neural network filter, to filter the at least portion of the picture.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), High Efficiency Video Coding (HEVC) or ITU-T H.265, including its range extension, multiview extension (MV-HEVC), and scalable extension (SHVC). Another example video coding standard is Versatile Video Coding (VVC) or ITU-T H.266, which has been developed by the Joint Video Expert TEAM (JVET) of ITU-T Video Coding Experts Group (VCEG) and ISO/IEC Motion Picture Experts Group (MPEG). Version 1 of the VVC specification, referred to as "VVC FDIS" hereinafter, is available from http://phenix.int-evry.fr/jvet/doc_end_user/documents/19_Teleconference/wg11/JVET-S2001-v17.zip.

Figure 1:
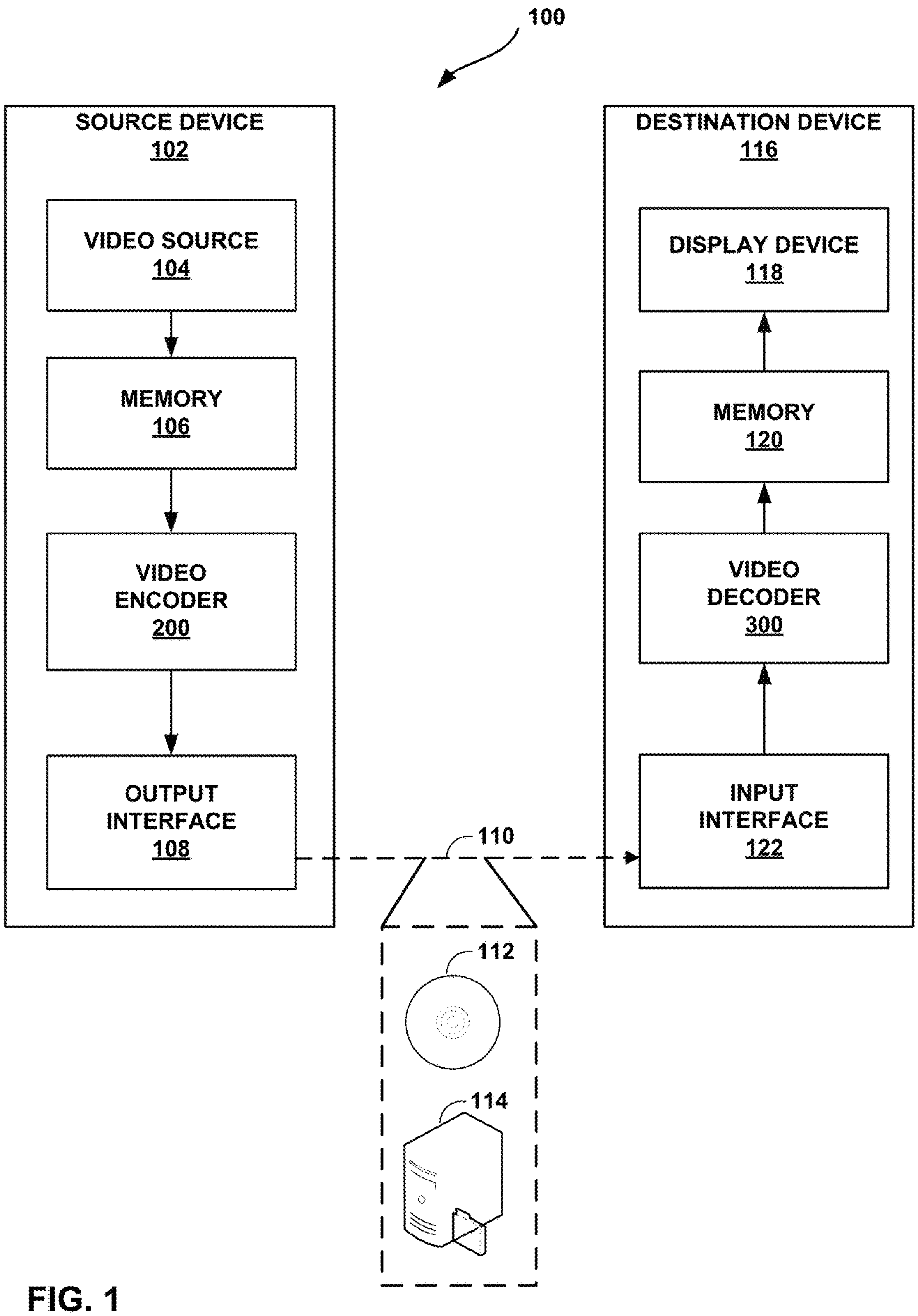
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing in-loop filtering by a neural network including processing of supplementary data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for performing in-loop filtering by a neural network including processing of supplementary data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that perform in-loop filtering by a neural network including processing of supplementary data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
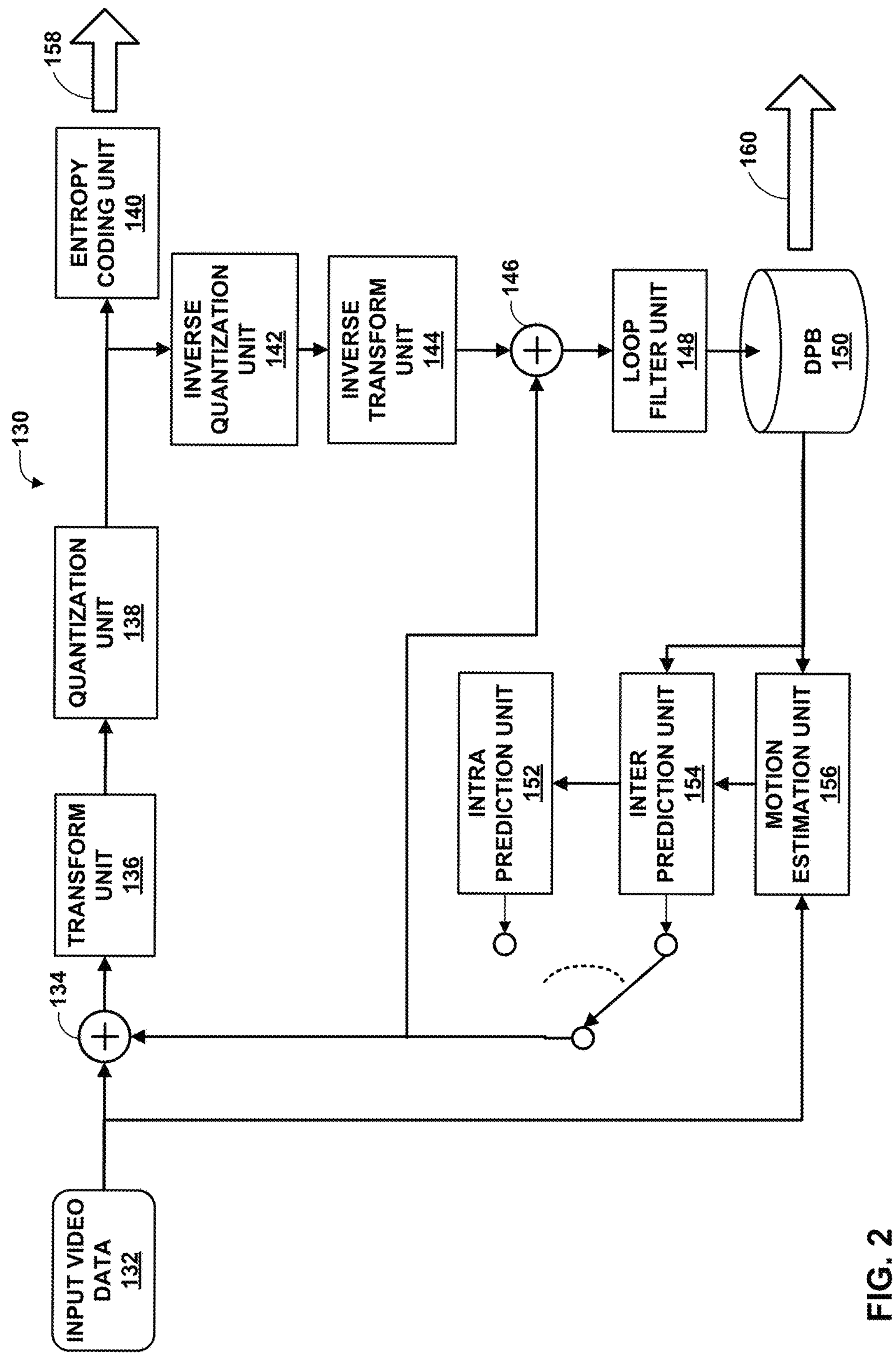
FIG. 2 is a conceptual diagram illustrating a hybrid video coding framework.

FIG. 2 is a conceptual diagram illustrating a hybrid video coding framework. Video coding standards since H.261 have been based on the so-called hybrid video coding principle, which is illustrated in FIG. 2. The term hybrid refers to the combination of two means to reduce redundancy in the video signal, i.e., prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two recent standards, ITU-T H.265/HEVC and ITU-T H.266/VVC.

As shown in FIG. 2, a modern hybrid video coder 130 generally includes block partitioning, motion-compensated or inter-picture prediction, intra-picture prediction, transformation, quantization, entropy coding, and post/in-loop filtering. In the example of FIG. 2, video coder 130 includes summation unit 134, transform unit 136, quantization unit 138, entropy coding unit 140, inverse quantization unit 142, inverse transform unit 144, summation unit 146, loop filter unit 148, decoded picture buffer (DPB) 150, intra prediction unit 152, inter-prediction unit 154, and motion estimation unit 156.

In general, video coder 130 may, when encoding video data, receive input video data 132. Block partitioning is used to divide a received picture (image) of the video data into smaller blocks for operation of the prediction and transform processes. Early video coding standards used a fixed block size, typically 16×16 samples. Recent standards, such as HEVC and VVC, employ tree-based partitioning structures to provide flexible partitioning.

Motion estimation unit 156 and inter-prediction unit 154 may predict input video data 132, e.g., from previously decoded data of DPB 150. Motion-compensated or inter-picture prediction takes advantage of the redundancy that exists between (hence "inter") pictures of a video sequence. According to block-based motion compensation, which is used in all the modern video codecs, the prediction is obtained from one or more previously decoded pictures, i.e., the reference picture(s). The corresponding areas to generate the inter prediction are indicated by motion information, including motion vectors and reference picture indices.

Summation unit 134 may calculate residual data as differences between input video data 132 and predicted data from intra prediction unit 152 or inter prediction unit 154. Summation unit 134 provides residual blocks to transform unit 136, which applies one or more transforms to the residual block to generate transform blocks. Quantization unit 138 quantizes the transform blocks to form quantized transform coefficients. Entropy coding unit 140 entropy encodes the quantized transform coefficients, as well as other syntax elements, such as motion information or intra-prediction information, to generate output bitstream 158.

Meanwhile, inverse quantization unit 142 inverse quantizes the quantized transform coefficients, and inverse transform unit 144 inverse transforms the transform coefficients, to reproduce residual blocks. Summation unit 146 combines the residual blocks with prediction blocks (on a sample-by-sample basis) to produce decoded blocks of video data. Loop filter unit 148 applies one or more filters (e.g., at least one of a neural network-based filter, a neural network-based loop filter, a neural network-based post loop filter, an adaptive in-loop filter, or a pre-defined adaptive in-loop filter) to the decoded block to produce filtered decoded blocks.

A block of video data, such as a CTU or CU, may in fact include multiple color components, e.g., a luminance or "luma" component, a blue hue chrominance or "chroma" component, and a red hue chrominance (chroma) component. The luma component may have a larger spatial resolution than the chroma components, and one of the chroma components may have a larger spatial resolution than the other chroma component. Alternatively, the luma component may have a larger spatial resolution than the chroma components, and the two chroma components may have equal spatial resolutions with each other For example, in 4:2:2 format, the luma component may be twice as large as the chroma components horizontally and equal to the chroma components vertically. As another example, in 4:2:0 format, the luma component may be twice as large as the chroma components horizontally and vertically. The various operations discussed above may generally be applied to each of the luma and chroma components individually (although certain coding information, such as motion information or intra-prediction direction, may be determined for the luma component and inherited by the corresponding chroma components).

In accordance with the techniques of this disclosure, loop filter unit 148 may receive a first color component (e.g., a luminance or "luma" component) having a first size and a second color component (e.g., a blue hue or red hue chrominance or "chroma" component) having a second size smaller than the first size from summation unit 146. A common block of video data may include both the first and second color components. Loop filter unit 148 may be configured to apply a downsampling convolutional neural network layer to the first color component of the block of video data to generate a downsampled first color component having the second size, i.e., to downsample the first color component to the size of the second color component. In one example, the first color component may be the luma component and the second component may be one of the two chroma components. In another example, the first color component may be a first chroma component and the second color component may be a second chroma component.

In yet another example, loop filter unit 148 may receive each of the luma and both chroma components, where the luma component has a first size, a first chroma component has a second size smaller than the first size, and a second chroma component has a third size smaller than the second size. In this example, loop filter unit may apply a downsampling convolutional neural network filter to both the luma component and the first chroma component to generate a downsampled luma component having the third size and a downsampled first chroma component having the third size.

Loop filter unit 148 may also filter the second color component to form a filtered second color component, e.g., using a convolutional neural network filter. Loop filter unit 148 may then concatenate the downsampled first color component with the filtered second color component to form concatenated color components. Then, loop filter unit 148 may filter the concatenated color components, e.g., using a convolutional neural network filter, to form a filtered concatenated component including a filtered downsampled first color component.

In particular, the first and second color components may originally be stored in separate arrays or matrices. To concatenate the color components, loop filter unit 148 may form a single array or matrix that is twice the width or twice the height of the individual color components. Loop filter unit 148 may then store samples of the first color component in a first region of the newly formed array or matrix and samples of the second color component in a second, neighboring region of the newly formed array or matrix. When three color components are used (e.g., luma, blue hue chroma, and red hue chroma), loop filter unit 148 may form a single array or matrix that is three times the width or height of the individual color components and store samples of each of the three color components in respective regions of the newly formed array or matrix.

As noted above, loop filter unit 148 may receive each of the luma and chroma components. Loop filter unit 148 may filter both of the downsampled first chroma component and the second chroma components, e.g., using a convolutional neural network filter, to generate a filtered downsampled first chroma component and filtered second chroma component. Loop filter unit 148 may then concatenate the downsampled luma component with the filtered downsampled first chroma component and the filtered second chroma component to form concatenated color components. Loop filter unit 148 may then filter the concatenated color components (including the downsampled luma component, the filtered downsampled first chroma component, and the filtered second chroma component), e.g., using a convolutional neural network filter.

After having filtered the concatenated color components, loop filter unit 148 may further upsample the filtered downsampled first color component back to the first size (i.e., the original size of the first color component). In cases where loop filter unit 148 also downsamples the second color component (e.g., from the second size to the third size), loop filter unit 148 may also upsample the filtered second color component to the second size (i.e., the original size of the second color component).

Figure 3:
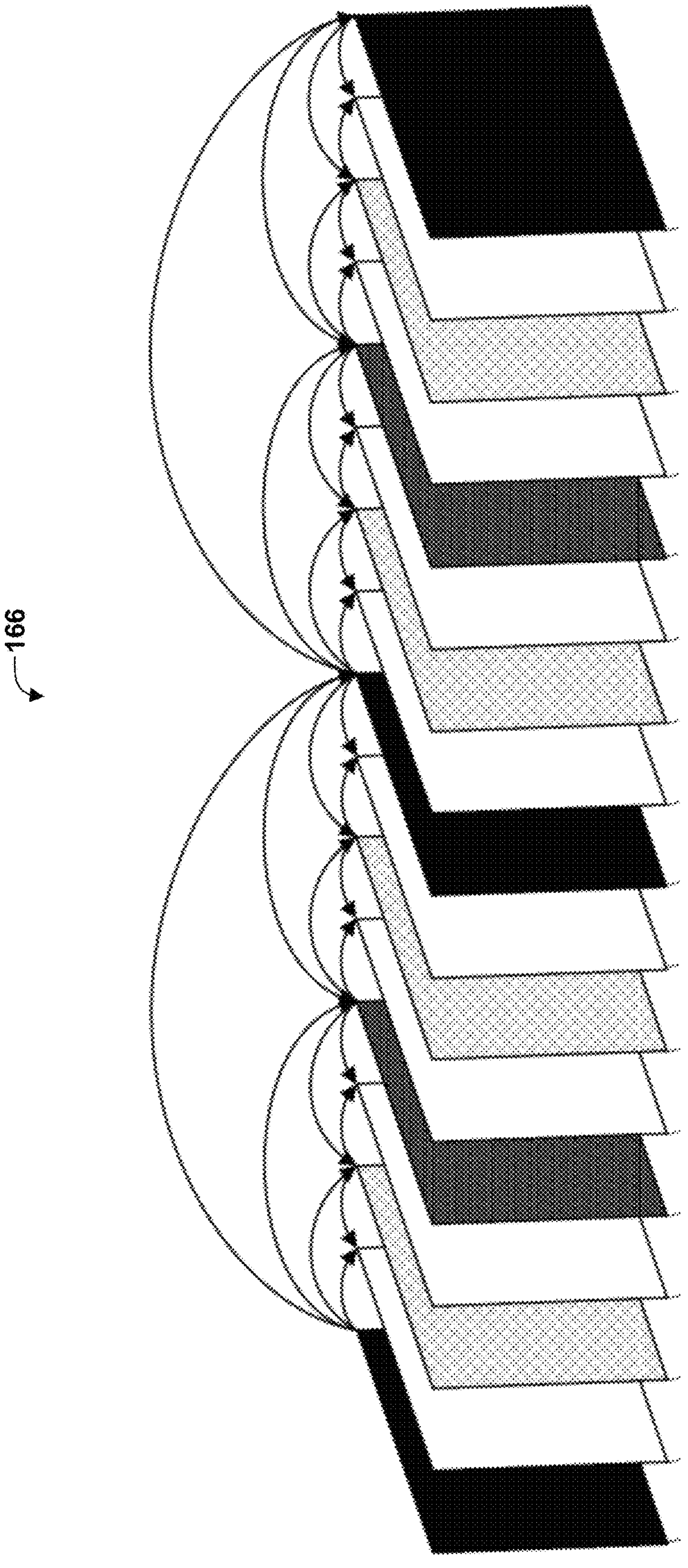
FIG. 3 is a conceptual diagram illustrating a hierarchical prediction structure using a group of pictures (GOP) size of 16.

FIG. 3 is a conceptual diagram illustrating a hierarchical prediction structure 166 using a group of pictures (GOP) size of 16. In recent video codecs, hierarchical prediction structures inside a group of pictures (GOP) is applied to improve coding efficiency.

Referring again to FIG. 2, intra-picture prediction exploits spatial redundancy that exists within a picture (hence "intra") by deriving the prediction for a block from already coded/decoded, spatially neighboring (reference) samples. The directional angular prediction, DC prediction and plane or planar prediction are used in the most recent video codec, including AVC, HEVC, and VVC.

Hybrid video coding standards apply a block transform to the prediction residual (regardless of whether it comes from inter- or intra-picture prediction). In early standards, including H.261, H.262, and H.263, a discrete cosine transform (DCT) is employed. In HEVC and VVC, more transform kernel besides DCT are applied, in order to account for different statistics in the specific video signal.

Quantization aims to reduce the precision of an input value or a set of input values in order to decrease the amount of data needed to represent the values. In hybrid video coding, quantization is typically applied to individual transformed residual samples, i.e., to transform coefficients, resulting in integer coefficient levels. In recent video coding standards, the step size is derived from a so-called quantization parameter (QP) that controls the fidelity and bit rate. A larger step size lowers the bit rate but also deteriorates the quality, which e.g., results in video pictures exhibiting blocking artifacts and blurred details.

Context-adaptive binary arithmetic coding (CABAC) is a form of entropy coding used in recent video codecs, e.g., AVC, HEVC, and VVC, due to its high efficiency.

Post/In-Loop Filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 2, the reconstructed pictures after in-loop filtering are stored and used as a reference for inter-picture prediction of subsequent pictures. The coding artifacts are mostly determined by the QP, therefore QP information is generally used in design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below:

$$R'(i,j) = R(i,j) + \left(\left(\sum_{k\neq 0}\sum_{l\neq 0} f(k,l)\times K(R(i+k,j+l)-R(i,j),c(k,l))+64\right)\gg 7\right) \quad (1)$$

where R(i, j) is the set of samples before the filtering process, R'(i,j) is a sample value after the filtering process. f(k,l) denotes filter coefficients, K(x,y) is a clipping function and c(k,l) denotes the clipping parameters. The variables k and l vary between $$-\frac{L}{2} \text{ and } \frac{L}{2}$$

where L denotes the filter length. The clipping function K (x,y)=min (y, max (−y,x)), which corresponds to the function Clip3 (−y, y, x). The clipping operation introduces non-linearity to make ALF more efficient by reducing the impact of neighbor sample values that are too different with the current sample value. In VVC, the filtering parameters can be signalled in the bit stream, it can be selected from the pre-defined filter sets. The ALF filtering process can also summarized using the following equation:

$$R'(i,j) = R(i,j) + \text{ALF\_residual\_output}(R) \quad (2)$$

Figure 4:
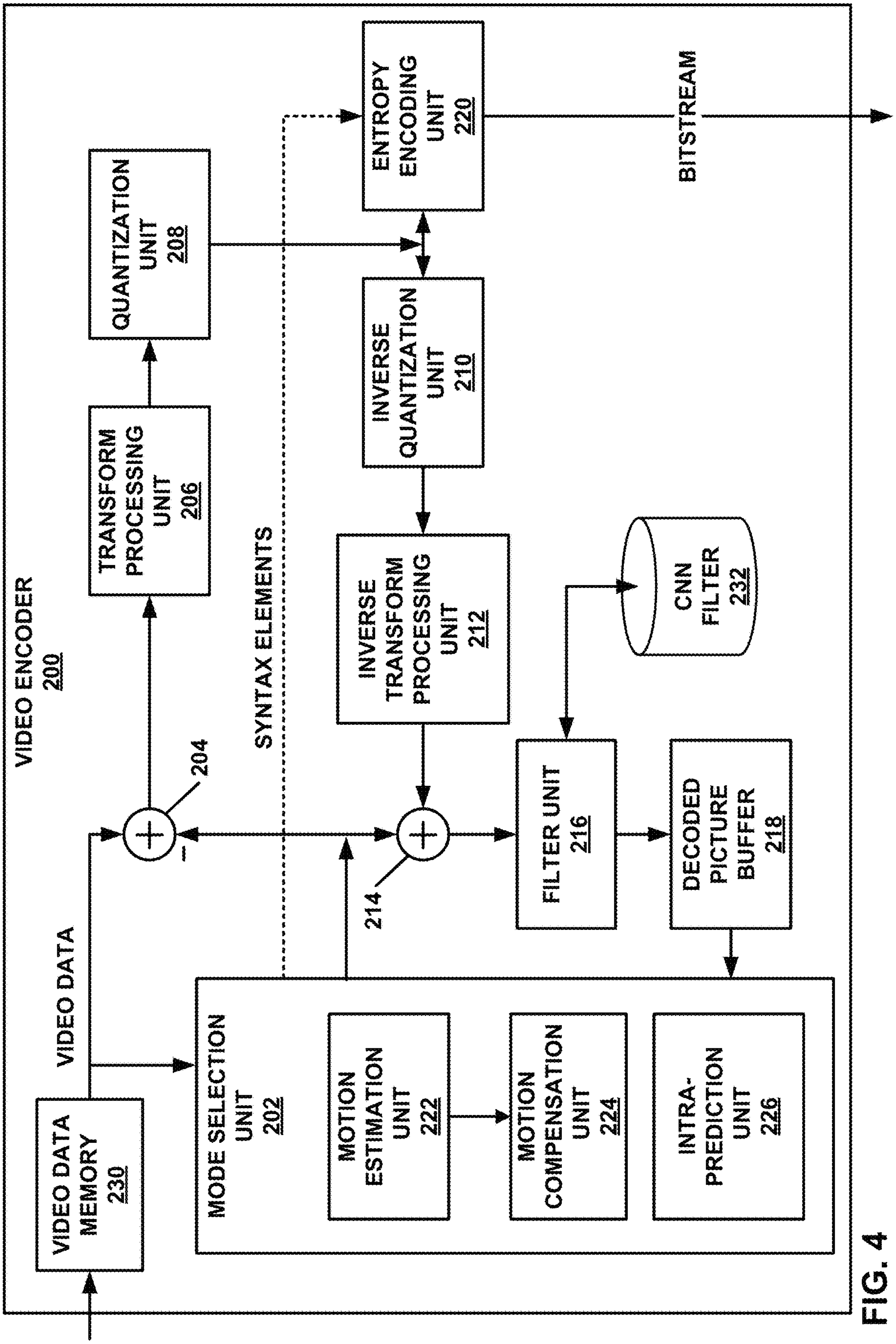
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUS, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may be configured to perform the various techniques of this disclosure, e.g., to combine two or more sets of supplemental data and then provide the sets of supplemental data as input to convolutional neural network (CNN) filter 232 to filter at least a portion of a decoded picture of video data.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 5:
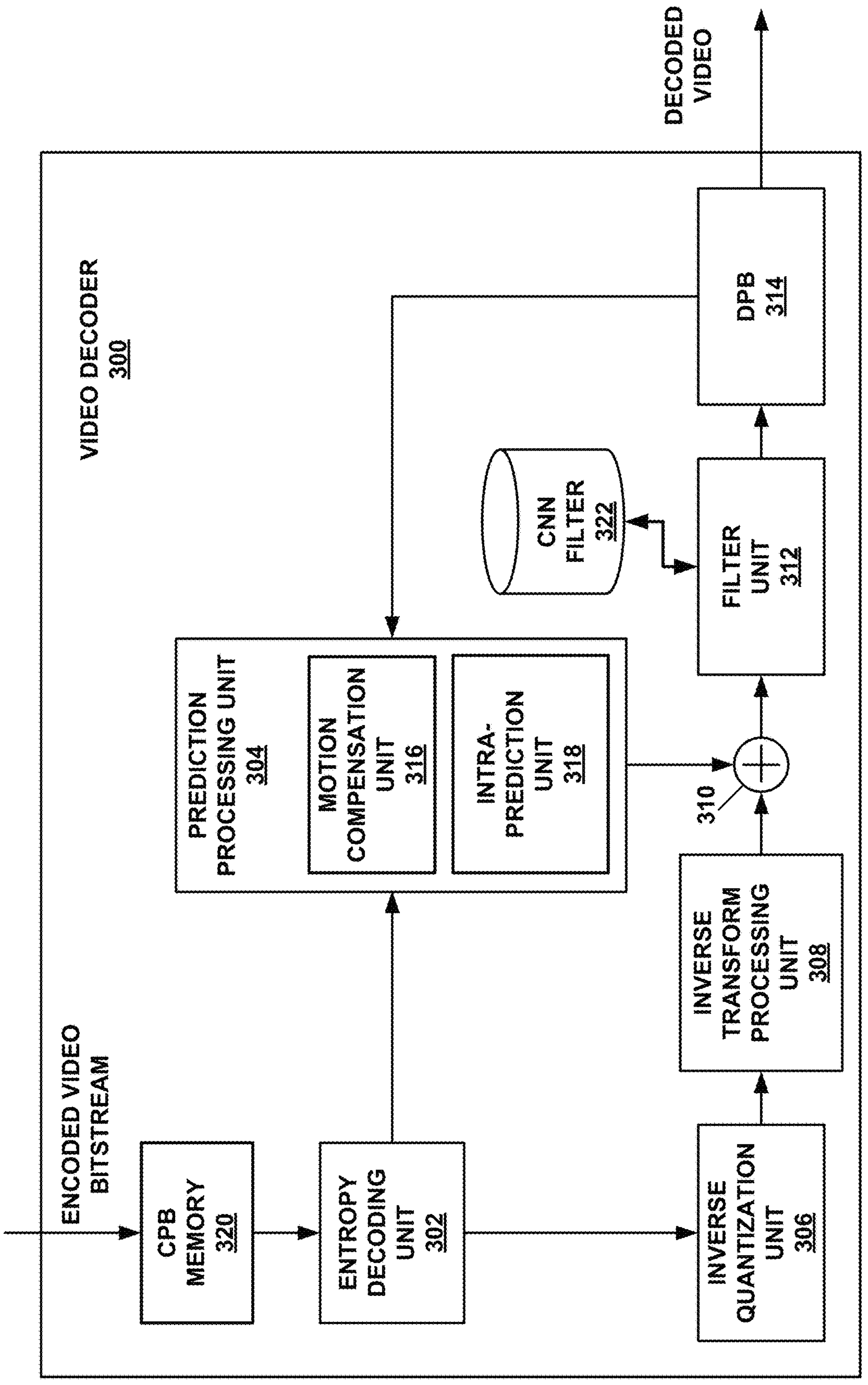
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream. Filter unit 312 may be configured to perform the various techniques of this disclosure, e.g., to combine two or more sets of supplemental data and then provide the sets of supplemental data as input to convolutional neural network (CNN) filter 322 to filter at least a portion of a decoded picture of video data.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 6:
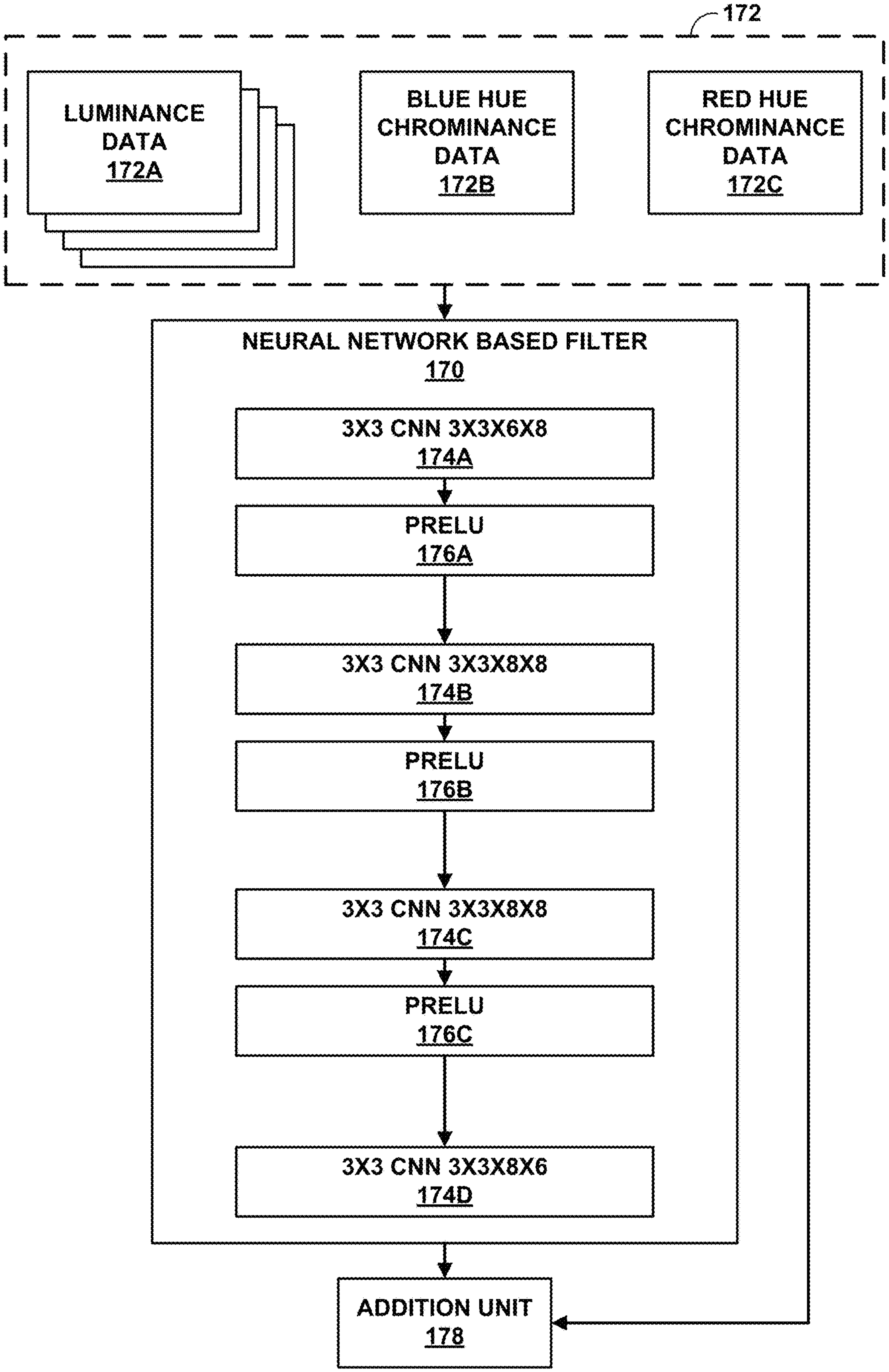
FIG. 6 is a conceptual diagram illustrating an example CNN-based filter with four layers.

FIG. 6 is a conceptual diagram illustrating an example CNN-based filter with four layers. In particular, FIG. 6 depicts an example neural network based filter 170. Neural network based filter 170 receives input 172 including luminance data 172A, blue hue chrominance data 172B, and red hue chrominance data 172C. Neural network based filter 170 includes 3×3 convolutional neural network (CNN) 3×3×6×8 174A, parametric rectified linear unit (PReLU) 176A, 3×3 CNN 3×3×8×8 174B, PReLU 176B, 3×3 CNN 3×3×8×8 174C, PReLU 176C, and 3×3 CNN 3×3×8×6 174D. Input 172 and output of neural network based filter 170 are provided to addition unit 178, which forms an output result including both luminance and chrominance data.

Embedding neural networks into a hybrid video coding framework can improve compression efficiency. Neural networks have been used for intra prediction and inter prediction to improve prediction efficiency. In some examples, the filtering process is applied as a post-filter. In the post-filter case, the filtering process is only applied to the output picture and the unfiltered picture is used as reference picture.

NN-based filters, such as neural network based filter 170, can be applied additionally to existing filters, such as deblocking filter, SAO and ALF. NN-based filters can also be applied exclusively, where they may be designed to replace all existing filters. Furthermore, the NN-based filters may replace one or more existing filters, and perform additional filtering tasks in addition to other unreplaced existing filters.

In the example of FIG. 6, the NN-based filtering process takes reconstructed luminance (luma) and chrominance (chroma) samples, packed in a 3D volume with 6 planes, as inputs. The intermediate outputs are residual samples, which are added back to the input to refine the input samples. The NN filter may use all color components as input to exploit cross-component correlations. The different components may share the same filters (including network structure and model parameters) or each component may have its own specific filters.

The filtering process can also be generalized as follows:

$$R'(i, j) = R(i, j) + \text{NN\_filter\_residual\_output}(R) \qquad (3)$$

The model structure and model parameters of NN-based filter(s) can pre-defined and be stored at video encoder 200 and video decoder 300. The filters can also be signalled in the bit stream.

When NN based filtering is applied in video coding, the whole video signal (pixel data) may be split into multiple processing units (e.g., 2D blocks), and each processing unit can be processed separately or be combined with other information associated with this block of pixels. The possible choices of processing unit include a frame, a slice/tile, a CTU or any pre-defined or signaled shapes and sizes.

To further improve the performance of NN based filtering, different types of input data can be processed jointly to produce the filtered output. Input data may include, but not limited to, reconstructed, prediction pixels, pixels after the loop filter(s), partitioning structure information, deblocking parameters (e.g., boundary strength (BS)), quantization parameter (QP) values, slice or picture types or filters applicability or coding modes map. Input data can be provided at different granularity. Luma reconstruction and prediction samples could be provided at the original resolution, whereas chroma samples could be provided at lower resolutions, e.g., for 4:2:0 representation, or can be up-sampled to the Luma resolution to achieve per-pixel representation. Similarly, QP, BS, partitioning, or coding mode information can be provided at lower resolution, including cases with a single value per frame/slice or processing block (e.g., QP), or this value can be expanded (replicated) to achieve per-pixel representation.

Figure 7:
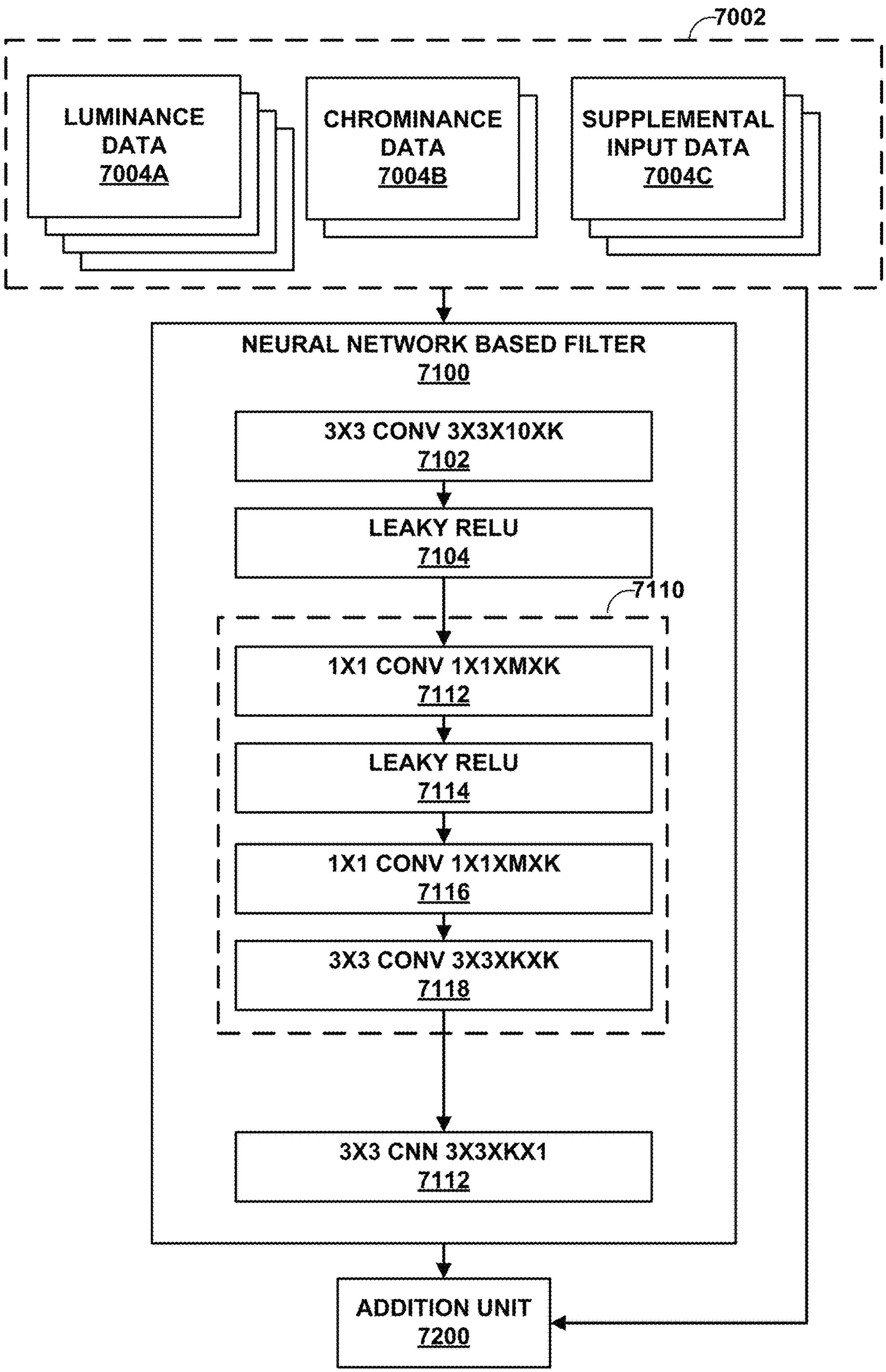
FIG. 7 is a conceptual diagram illustrating a CNN-based filter with padded input samples and supplementary data.

FIG. 7 is a conceptual diagram illustrating a CNN-based filter with padded input samples and supplementary data. FIG. 7 depicts an example of an architecture utilizing supplementary data. In this example, pixels of the processing block (4 sublocks of interlaced Luma samples plane and associated Cb and Cr planes) are combined with supplementary information, such as QP steps and BS. Note that the area of the processing pixel is extended with 4 padded pixels from each side. The total size of the processing volume is (4+64+4)×(4+64+4)×(4 Y+2UV+1QP+3BS).

That is, in this example, input 7002 includes luminance data 7004A, chrominance data 7004B, and supplemental input data 7004C. Chrominance data 7004B may include both blue hue and red hue chrominance data. Supplemental input data 7004C may include data such as, for example, quantization step size data, boundary strength data, or the like. In general, each set of luminance data 7004A, chrominance data 7004B, and supplemental input data 7004C may have the same layer size (e.g., height and width).

Neural network based filter 7100 receives and filters input data 7002. In this example, neural network based filter 7100 includes 3×3 convolutional 3×3×10×K filter 7102, leaky ReLU module 7104, one or more hidden layers 7110 each including 1×1 conv 1×1×M×K filter 7112, leaky ReLU module 7114, 1×1 conv 1×1×M×K filter 7116, and 3×3 conv 3×3×K×K filter 7118. Neural network based filter 7100 also includes 3×3 conv 3×3×K×1 filter 7112. Addition unit 7200 combines the output of neural network based filter 7100 and original input 7002 to produce filtered output.

To further improve the performance of NN based filtering, multi-mode solutions can be designed. For example, for each processing unit, video encoder 200 may select from among a set of modes based on rate-distortion optimization and signal the selected mode in the bit-stream. The different modes may include different NN models, different values that may be used as the input information of the NN models, or the like. As an example, a NN based filtering solution may provide multiple modes based on a single NN model by using different QP values as input to the NN model for different modes.

Figure 8:
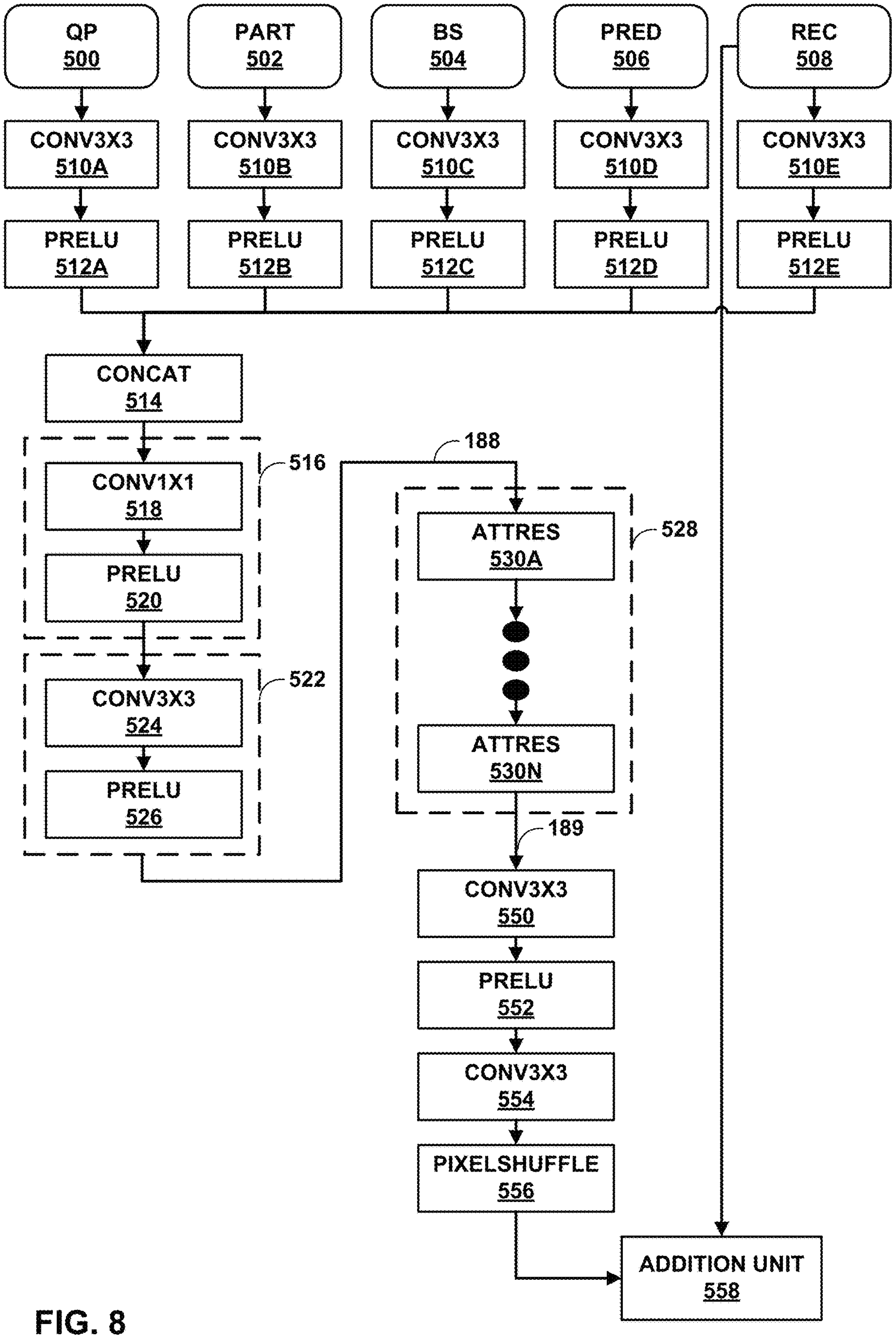
FIGS. 8-15 are conceptual diagrams illustrating various examples of CNN architectures.

FIG. 8-14 are conceptual diagrams illustrating various examples of CNN architectures. An example CNN structure is shown in FIG. 8. FIG. 8 depicts an example NN-based filter with multiple modes. The NN-based filter includes a first portion including input 3×3 convolution filters 510A-510E, respective parametric rectified linear unit (PReLU) filters 512A-512E, concatenation unit 514, fuse filter 516 and transition filter 522; a set 528 of attention residual (AttRes) blocks 530A-530N; and a last portion including 3×3 convolution filter 550, PReLU filter 552, 3×3 convolution filter 554, and pixel shuffle unit 556.

In the first portion, different inputs, including quantization parameter (QP) 500, partition information (part) 502, boundary strength (BS) 504, prediction information (pred) 506, and reconstructed block (rec) 508 are received. Respective 3×3 convolution filters 510A-510E and PReLU filters 512A-512E convolve the respective inputs. Concatenation unit 514 then concatenates the convolved inputs. Fuse filter 516, including 1×1 convolution filter 518 and PReLU filter 520, fuses the concatenated inputs. Transition filter, including 3×3 convolutional filter 524 and PReLU filter 526, sub-samples the fused inputs to create output 188. Output 188 is then fed through set 528 of attention residual blocks 530A-530N, which may include a various number of attention residual blocks, e.g., 8. The attention block is explained further with respect to FIG. 9. Output 189 from the last of the set of attention residual blocks 184 is fed to the last portion. In the last portion, 3×3 convolution filter 550, PReLU filter 552, 3×3 convolution filter 554, and pixel shuffle unit 556 processes output 189, and addition unit 558 combines this result with the original reconstructed block input 508. This ultimately forms output for presentation and storage as reference for subsequent inter-prediction, e.g., in a decoded picture buffer (DPB).

Figure 9:
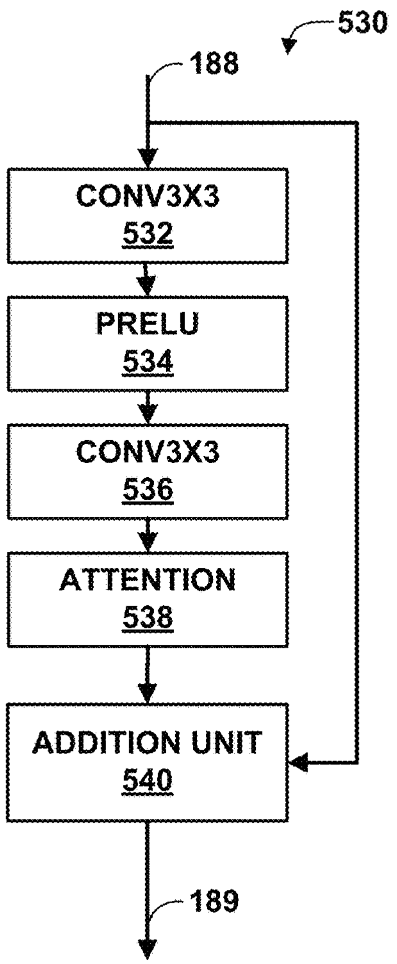

FIG. 9 is a conceptual diagram illustrating an attention residual block of FIG. 8. That is, FIG. 9 depicts attention residual block 530, which may include components similar to those of attention residual blocks 530A-530N of FIG. 9. In this example, attention residual block 530 includes first 3×3 convolutional filter 532, parametric rectified linear unit (PReLU) filter 534, second 3×3 convolutional filter 536, an attention block 538, and addition unit 540. Addition unit 540 combines the output of attention block 538 and output 188, initially received by convolution filter 532, to generate output 189.

Figure 10:
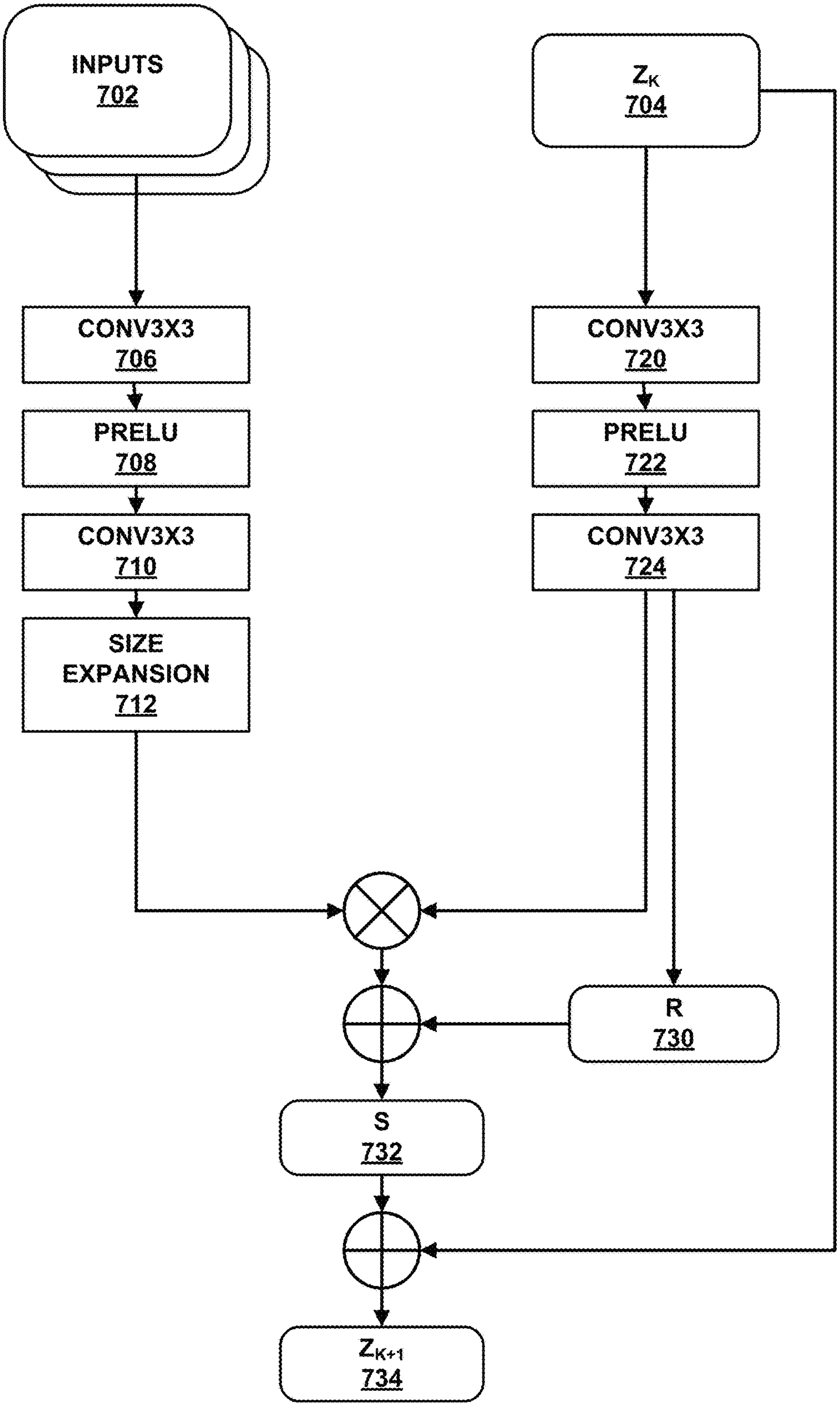

FIG. 10 depicts another example of the spatial attention layer in the AttRes block 530 of FIG. 8. As shown in FIG. 10, a spatial attention layer of attention residual block includes 3×3 convolutional filter 706, PReLU filter 708, 3×3 convolution filter 710, size expansion unit 712, 3×3 convolution filter 720, PReLU filter 722, and 3×3 convolution filter 724. 3×3 convolution filter 706 receives inputs 702, corresponding to quantization parameter (QP) 500, partition information (part) 502, boundary strength (BS) 504, prediction information (pred) 506, and reconstructed block (rec) 508 of FIG. 10. 3×3 convolution filter 720 receives $Z_K$ 704. The outputs of size expansion unit 712 and 3×3 convolution filter 724 are combined, and then combined with R value 730 to generate S value 732. S value 732 is then combined with $Z_K$ value 704 to generate output $Z_{K+1}$ value 734.

Figure 11:
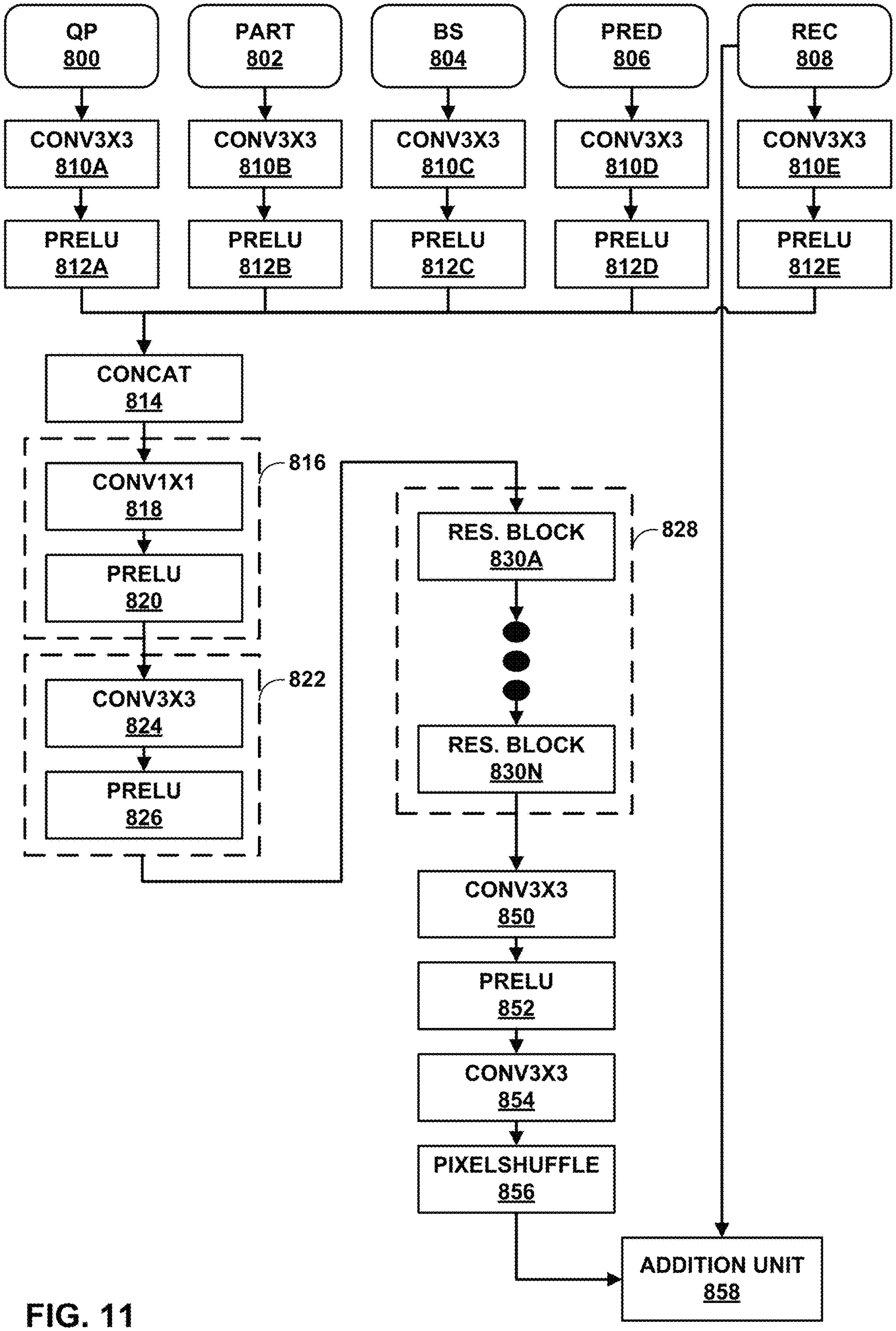

FIG. 11 depicts an alternative NN architecture. The example of FIG. 11 includes an example residual block structure that may be substituted for the attention residual blocks of FIG. 8. In the example of FIG. 11, a larger number of low complexity residual blocks are used in the backbone of the example of FIG. 8, along with a reduced number of channels (feature maps), and removal of the attention modules.

The NN based filter of FIG. 11 includes 3×3 convolution filters 810A-810E and PReLU filters 812A-812E, which convolve respective inputs, i.e., QP 800, Part 802, BS 804, Pred 806, and Rec 808. Concatenation unit 814 concatenates the convolved inputs. Fuse filter 816 then fuses the concatenated inputs using 1×1 convolution filter 818 and PReLU filter 820. Transition unit 822 then processes the fused data using 3×3 convolution filter 824 and PReLU filter 826.

In this example, the NN based filter includes a set 828 of residual blocks 830A-830N, each of which may be structured according to residual block structure 830 of FIG. 12, as discussed below. Residual blocks 830A-830N may replace AttRes blocks 530A-530N of FIG. 8. The example of FIG. 11 may be used for luminance (luma) filtering, although as discussed below, similar modifications may be made for chrominance (chroma) filtering.

In the last portion, 3×3 convolution filter 850, PReLU filter 852, 3×3 convolution filter 854, and pixel shuffle unit 856 processes output 189, and addition unit 858 combines this result with the original reconstructed block input 808. This ultimately forms output for presentation and storage as reference for subsequent inter-prediction, e.g., in a decoded picture buffer (DPB).

The number of residual blocks and channels included in set 828 of FIG. 11 can be configured differently. That is, N may be set to a different value, and the number of channels in residual block structure 830 may be set to a number different than 160, to achieve different performance-complexity tradeoffs. Chroma filtering may be performed with these modifications for processing of chroma channels.

Set 828 of residual blocks 830A-830N has N instances of residual block structure 830. In one example, N may be equal to 32, such that there are 32 residual block structures. Residual blocks 830A-830N may use 64 feature maps, which is reduced relative to the 96 feature maps used in the example of FIG. 8.

The number of residual blocks M used may be 24. The number of features maps (convolutions) may be 64. In the ResBlocks, the number of channels may be increased to 160 before the activation layer, and then decreased to 64 after the activation layer. The number of residual blocks and channels can be configured differently (M may be set to another value and the number of channels in the residual block can be set to a number different than 160) for different performance-complexity trade-offs. Chroma filtering may follow the concept of the example of FIG. 8, with the above modifications to its backbone for processing of chroma channels.

Figure 12:
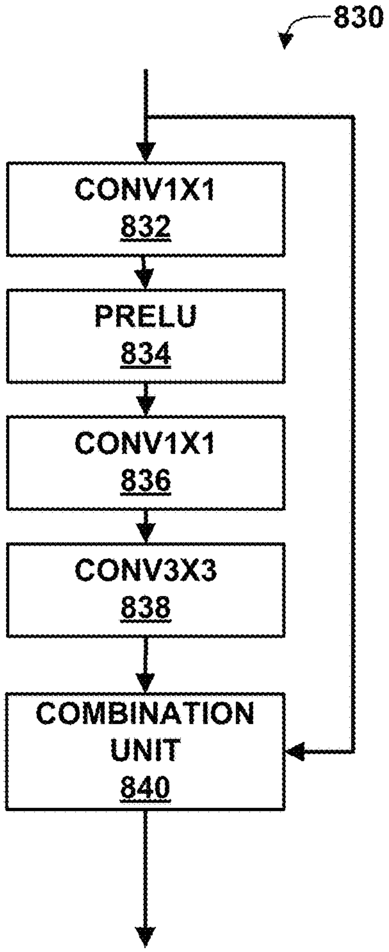

FIG. 12 is a conceptual diagram illustrating an example residual block structure 830 of FIG. 11. In this example, residual block structure 830 includes first 1×1 convolutional filter 832, which may increase a number of input channels to 160, before an activation layer (PReLU filter 834) processes the input channels. PReLU filter 834 may thereby reduce the number of channels to 64 through this processing. Second 1×1 convolution filter 836 then processes the reduced channels, followed by 3×3 convolution filter 838. Finally, combination unit 840 may combine the output of 3×3 convolution filter 838 with the original input received by residual block structure 830.

Figure 13:
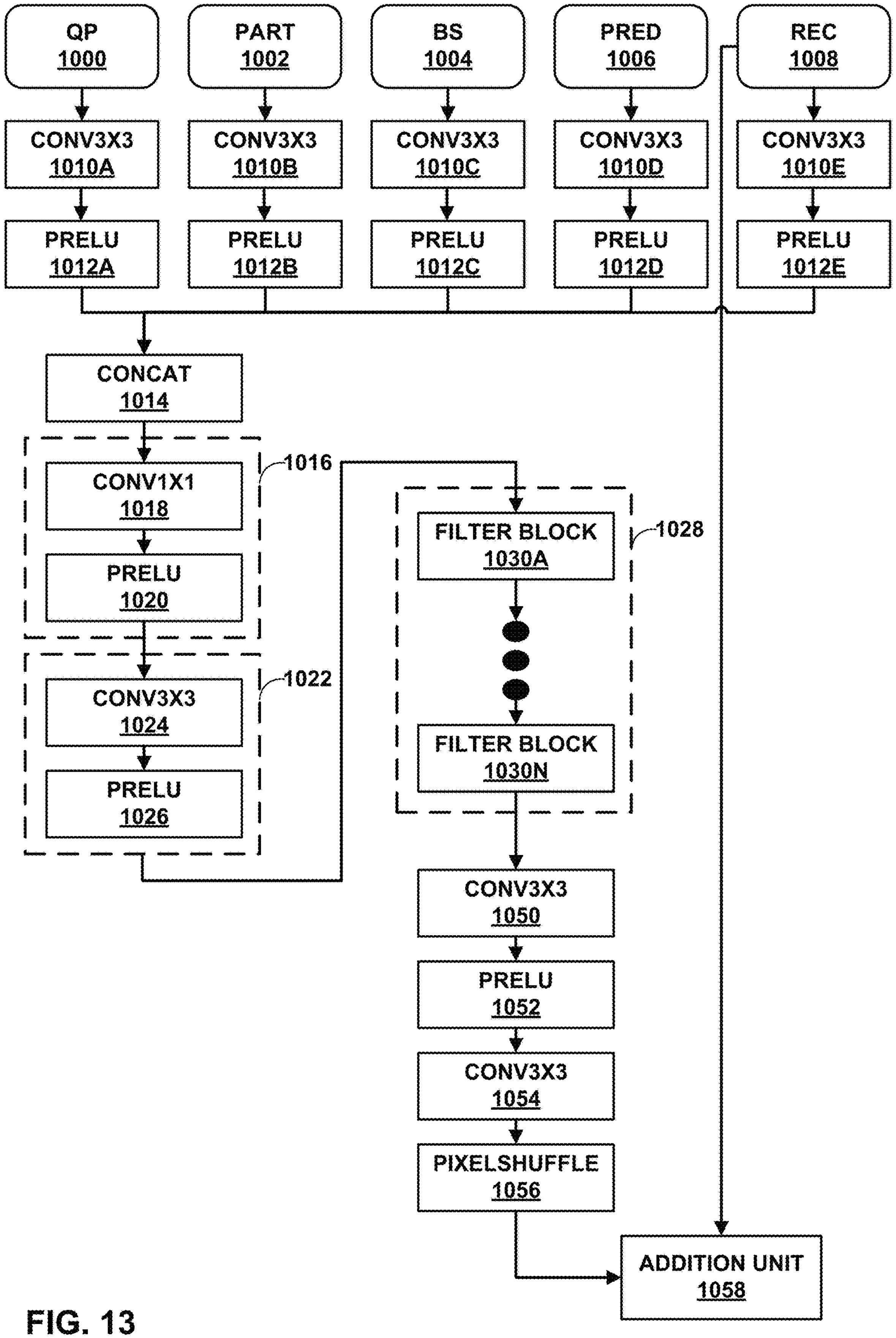

FIG. 13 is a conceptual diagram illustrating another example filtering block structure that may be substituted for the set of attention residual blocks of FIG. 5. The NN based filter of FIG. 13 includes 3×3 convolution filters 1010A-1010E and PReLU filters 1012A-1012E, which convolve respective inputs, i.e., QP 1000, Part 1002, BS 1004, Pred 1006, and Rec 1008. Concatenation unit 1014 concatenates the convolved inputs. Fuse filter 1016 then fuses the concatenated inputs using 1×1 convolution filter 1018 and PReLU filter 1020. Transition unit 1022 then processes the fused data using 3×3 convolution filter 1024 and PReLU filter 1026.

In this example, NN-based filtering unit 1028 includes N filter blocks 1030A-1030N, each of which may have the structure of filter block 1030 of FIG. 14 as discussed below. Filter block structure 1030 may be substantially similar to residual block structure 830, except that combination unit 840 is omitted from filter block structure 1030, such that input is not combined with output. Instead, output of each residual block structure may be fed directly to the subsequent block.

The filtered output of NN-based filtering unit 1028 may then be processed by 3×3 convolutional filter 1050, PReLU 1052, 3×3 convolutional filter 1054, and pixel shuffle unit 1056. Addition unit 1058 may then combine the resulting filtered output with the original input data.

The number of channels and number of filter blocks may be configurable. In one example, it could be set to 64 channels and 32 filter blocks. The number of increased channels in each filter block may be 160 as discussed above.

In this example, the bypass branch around convolution and activation layers in the residual block, as in FIG. 11, is removed. The number of channels and number of filter blocks can be configurable, for example, 64 channels, 24 filter blocks, with 160 channels before and after the activation, which results in the complexity of the network being 605.93 kMAC and the number of parameters is 1.5 M for the intra luma model.

Figure 14:
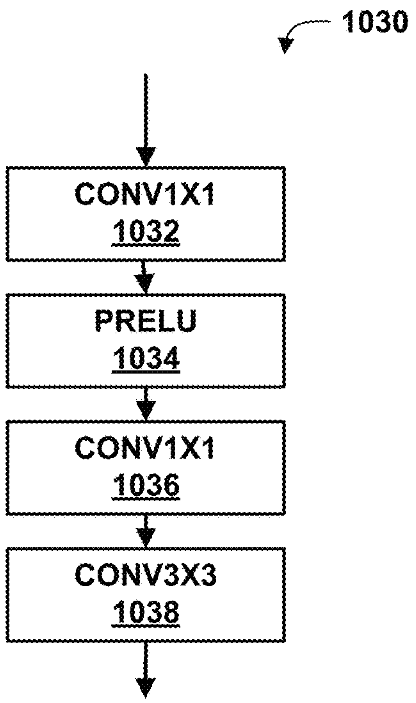

FIG. 14 is a conceptual diagram illustrating an example filter block structure 1030 of FIG. 13. In this example, residual block structure 1030 includes first 1×1 convolutional filter 1032, which may increase a number of input channels to 160, before an activation layer (PReLU filter 1034) processes the input channels. PReLU filter 1034 may thereby reduce the number of channels to 64 through this processing. Second 1×1 convolution filter 1036 then processes the reduced channels, followed by 3×3 convolution filter 1038. As discussed above, filter block structure 1030 does not include a combination unit, in contrast with the residual block structure 830 of FIG. 12.

Figure 15:
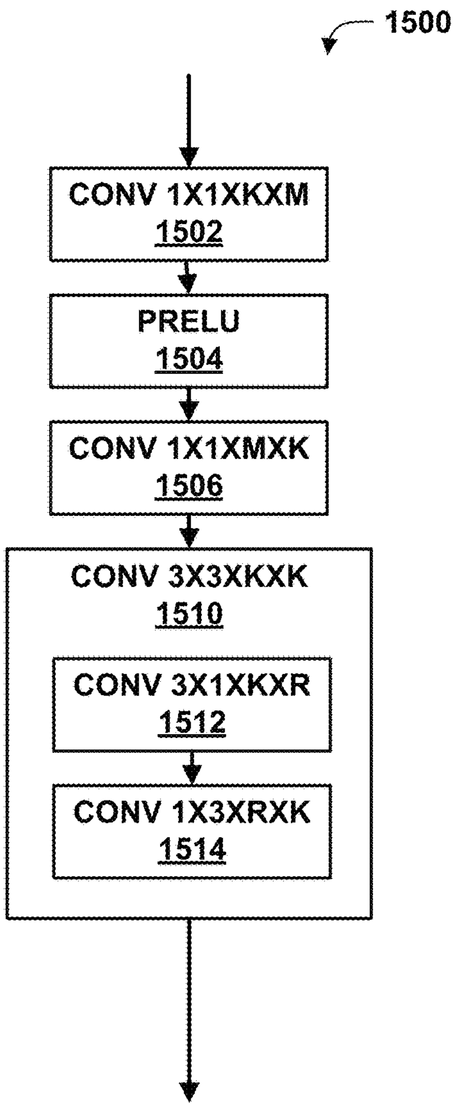

FIG. 15 is a conceptual diagram that depicts another example NN architecture 1500. In this example, NN architecture 1500 includes 1×1×K×M convolutional filter 1502, PReLU filter 1504, 1×1×M×K convolutional filter 1506, and decomposed 1×1×M×K convolutional filter 1510. Decomposed 1×1×M×K convolutional filter 1510, in this example, is decomposed into 3×1×K×R convolutional filter 1512 and 1×3×R×K convolutional filter 1514. Separate convolution in place of 2D convolutions (3×3) may achieve further complexity reduction of a CCN ILF architecture. For example, a 3×3×M×N convolution may be decomposed into two separable convolutions (3×1×M×R, 1×3×R×M) using a low-rank convolution approximation, as in the example of FIG. 15. The separable convolutions (3×1×K×R convolutional filter 1512 and 1×3×R×K convolutional filter 1514) may then be applied to the residual block of the architecture described above. Here, R is the rank of the approximation, and can ablate the performance/complexity of the approximation.

In some examples, the architecture of FIG. 11, with the decomposition illustrated in FIG. 15, may be implemented with parameters K=64, M=160 and R=51, and total number of 24 residual blocks results in the complexity of the network is 356.43 kMAC and the number of parameters is 1.07 M for the intra luma model.

Figure 16:
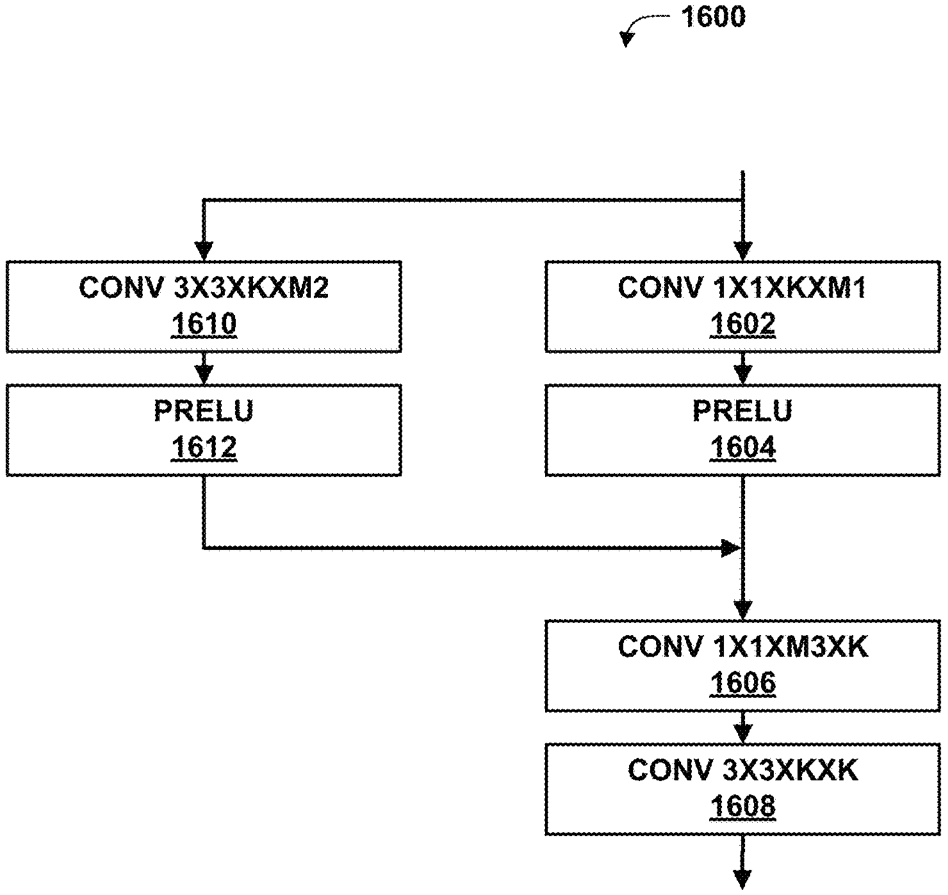
FIG. 16 is a conceptual diagram illustrating an example of a revised residual block architecture.

FIG. 16 is a conceptual diagram illustrating an example of a revised residual block architecture 1600. To improve the performance of the example architecture of FIG. 15, point-wise input convolution module (1×1×K×M1) 1602 and PReLU module 1604 may be supplemented with a parallel 3×3×K×M2 convolution 1610, followed by PReLU module 1612 and concatenation into a single processing volume of two outputs with M3=M1+M2, using 1×1×M3×K convolutional module 1606 and 3×3×K×K module 1608. This change introduces elements of multi-scale processing, with spatial information in the feature map being capture by 3×3 convolution in one branch, and information across the features being captured additionally by a point-wise convolution in another branch. Proper selection of the values of M1 and M2 for the residual block could provide an architecture with better performance/complexity trade-off, compared to the base design (defined by the parameter M). In one example, architecture 1600 may be implemented with the following parameters: K=64, M1=160, M2=32, M3=M1+M2.

Introduction of the separable decomposition for 3×3 convolution kernels can provide desired complexity reduction. Parameters of decomposition can control the amount of the complexity reduction.

Figure 17:
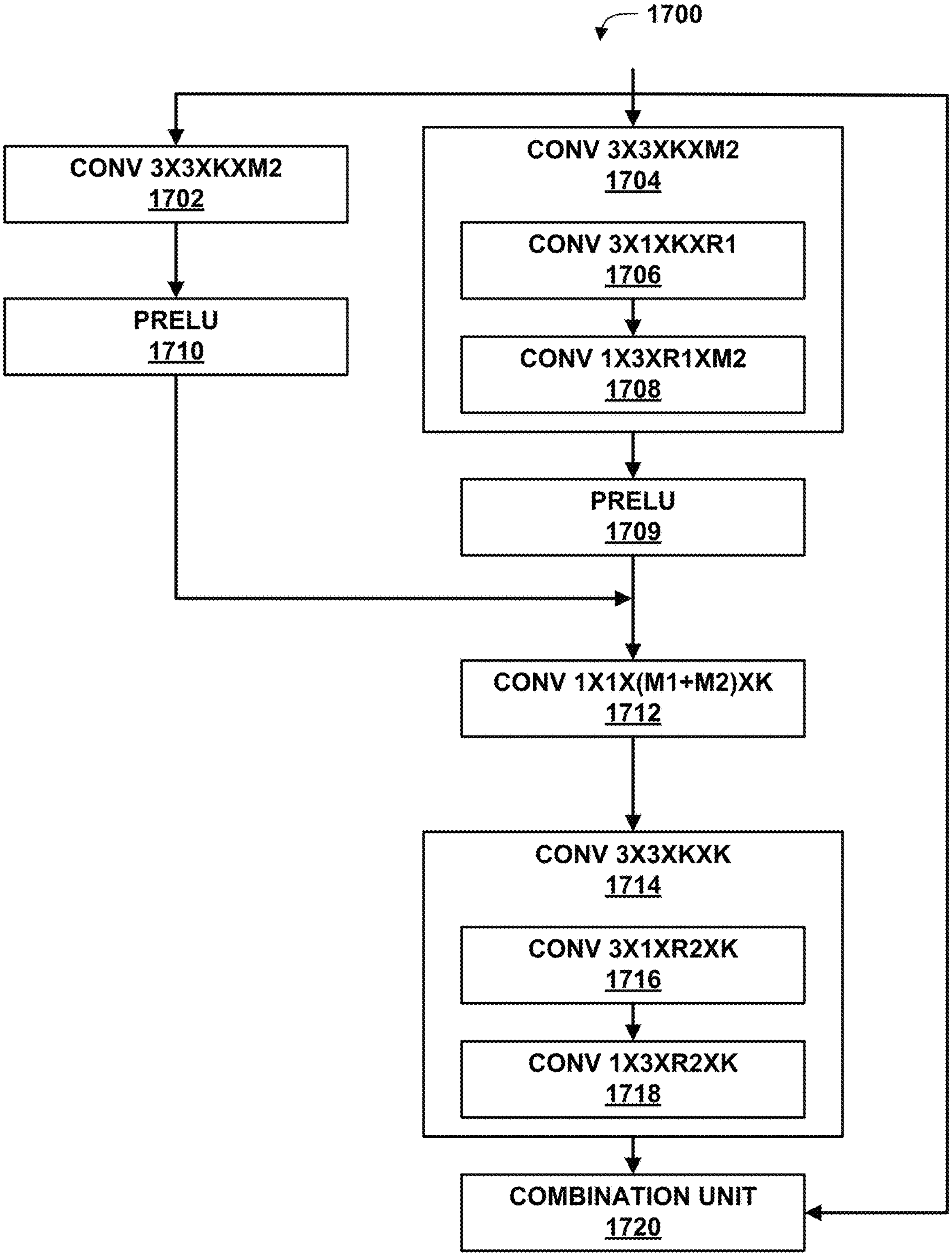
FIG. 17 is a conceptual diagram illustrating an example of a revised CNN architecture with 3×3 convolution blocks being replaced by separable convolutions of 3×1 and 1×3.

FIG. 17 is a conceptual diagram illustrating an example of a revised CNN architecture 1700 with 3×3 convolution blocks being replaced by separable convolutions of 3×1 and 1×3. That is, CNN architecture 1700 includes 3×3×K×M2 convolutional filter 1702, PReLU module 1710, decomposed 3×3×K×M2 convolutional filter 1704 including 3×1×K×R1 convolutional filter 1706 and 1×3×R1×M2 convolutional filter 1708, PReLU module 1709, 1×1×(M1+M2)×K convolutional filter 1712, decomposed 3×3×K×K convolutional filter 1714 including 3×1×R2×K convolutional filter 1716 and 1×3×R2×K convolutional filter 1718, and combination unit 1720. In this example, the 3×3 convolutions are decomposed into a 3×1×C1×R convolution and followed by a 1×3×R×C2 convolution, where C1 and C2 are the number of input and output channels, respectively, and R is the rank of the approximation. The parameter R can be derived as R=C1×C2/(C1+C2) and controls the complexity of the approximation.

In some examples, the architecture of FIG. 11 with residual blocks illustrated in FIG. 14 may be implemented with parameters R1=8, R2=44, M1=160 and M2=32, and total number of 24 residual blocks, the complexity of the network will be 358.43 kMAC and the number of parameters is 1.07 M for the intra luma model. Furthermore, different algorithms for finding separable kernels to replace 2D kernel can be employed. In some embodiments, a Candecomp/Parafac (CP) tensor decomposition can be used. V. Lebedev, Y. Ganin, M. Rakhuba, I. Oseledets, V. Lempitsky, “Speeding up Convolutional Neural Networks Using Fine-tuned CP-Decomposition,” ICLR 2015, available at arxiv.org/pdf/1412.6553.pdf, describes other potential decompositions that may be used.

Figure 18:
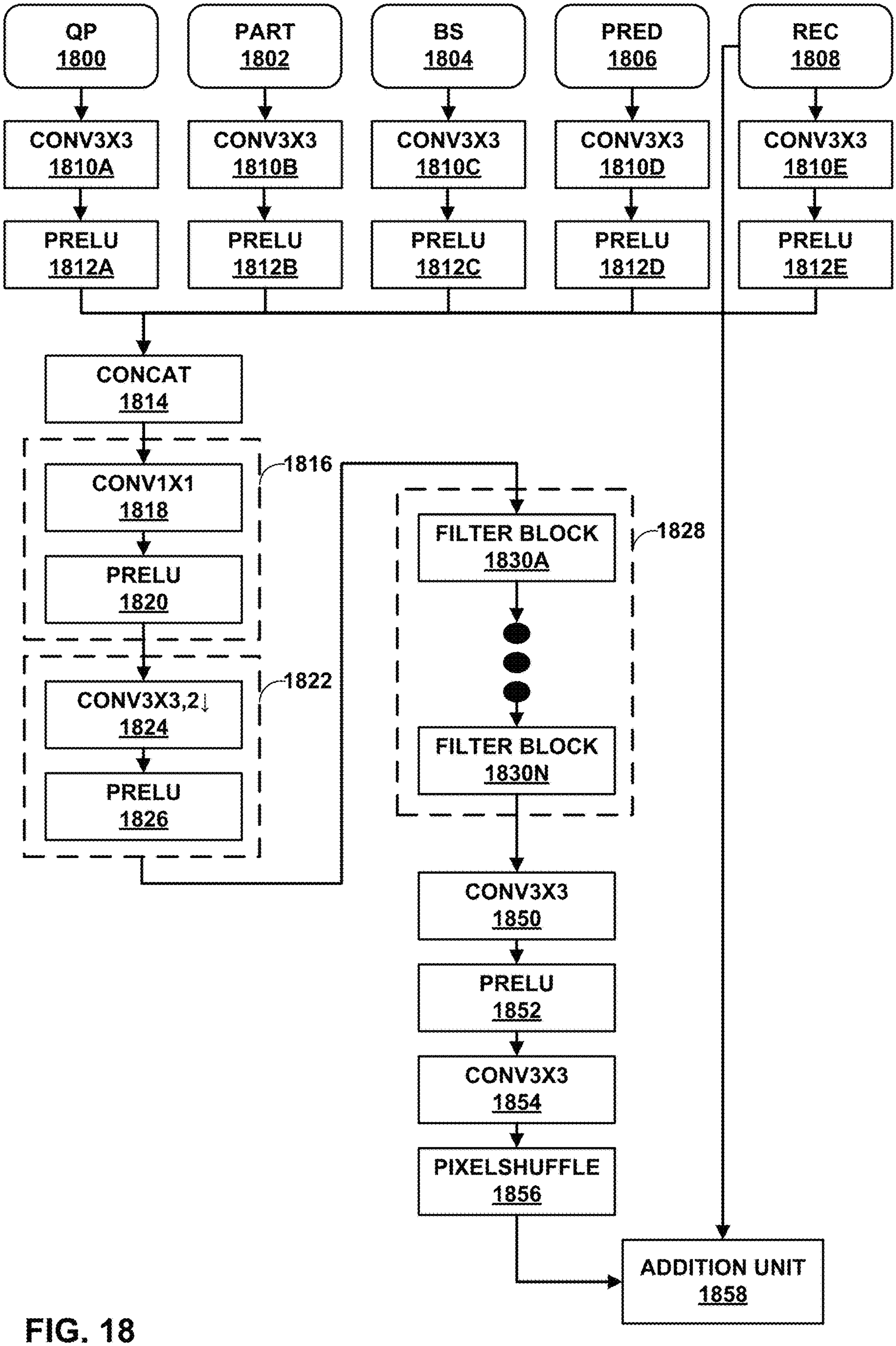
FIG. 18 is a conceptual diagram illustrating an example set of blocks of a CNN architecture to which techniques may be applied to reduce complexity.

FIG. 18 is a conceptual diagram illustrating an example set of blocks of a CNN architecture to which techniques may be applied to reduce complexity. In this example, the CNN architecture includes 3×3 convolution filters 1810A-1810E and PReLU filters 1812A-1812E, which convolve respective inputs, i.e., QP 1800, Part 1802, BS 1804, Pred 1806, and Rec 1808. Concatenation unit 1814 concatenates the convolved inputs. Fuse filter 1816 then fuses the concatenated inputs using 1×1 convolution filter 1818 and PReLU filter 1820. Transition unit 1822 then processes the fused data using 3×3, 2↓ convolution filter 1824, and PReLU filter 1826.

In this example, NN-based filtering unit 1828 includes N filter blocks 1830A-1830N. Filter block structure 1830 may be substantially similar to residual block structure 830, except that combination unit 840 is omitted from filter block structure 1030, such that input is not combined with output. Instead, output of each residual block structure may be fed directly to the subsequent block.

The filtered output of NN-based filtering unit 1828 may then be processed by 3×3 convolutional filter 1850, PReLU 1852, 3×3 convolutional filter 1854, and pixel shuffle unit 1856. In this example, 3×3 convolutional filter 1850 may be a 3×3×64×64 convolutional kernel, and 3×3 convolutional filter 1854 may be a 3×3×64×64 convolutional filter. Addition unit 1858 may then combine the resulting filtered output with the original input data.

Utilization of the proposed decomposition and complexity reduction methods in the CNN architecture can be applied beyond the filter blocks/residue blocks. Modules of the 3×3×M×N convolutions of the architecture that can be additionally implemented through decomposition are shown in FIG. 15 outlined in dashed lines.

Figure 19:
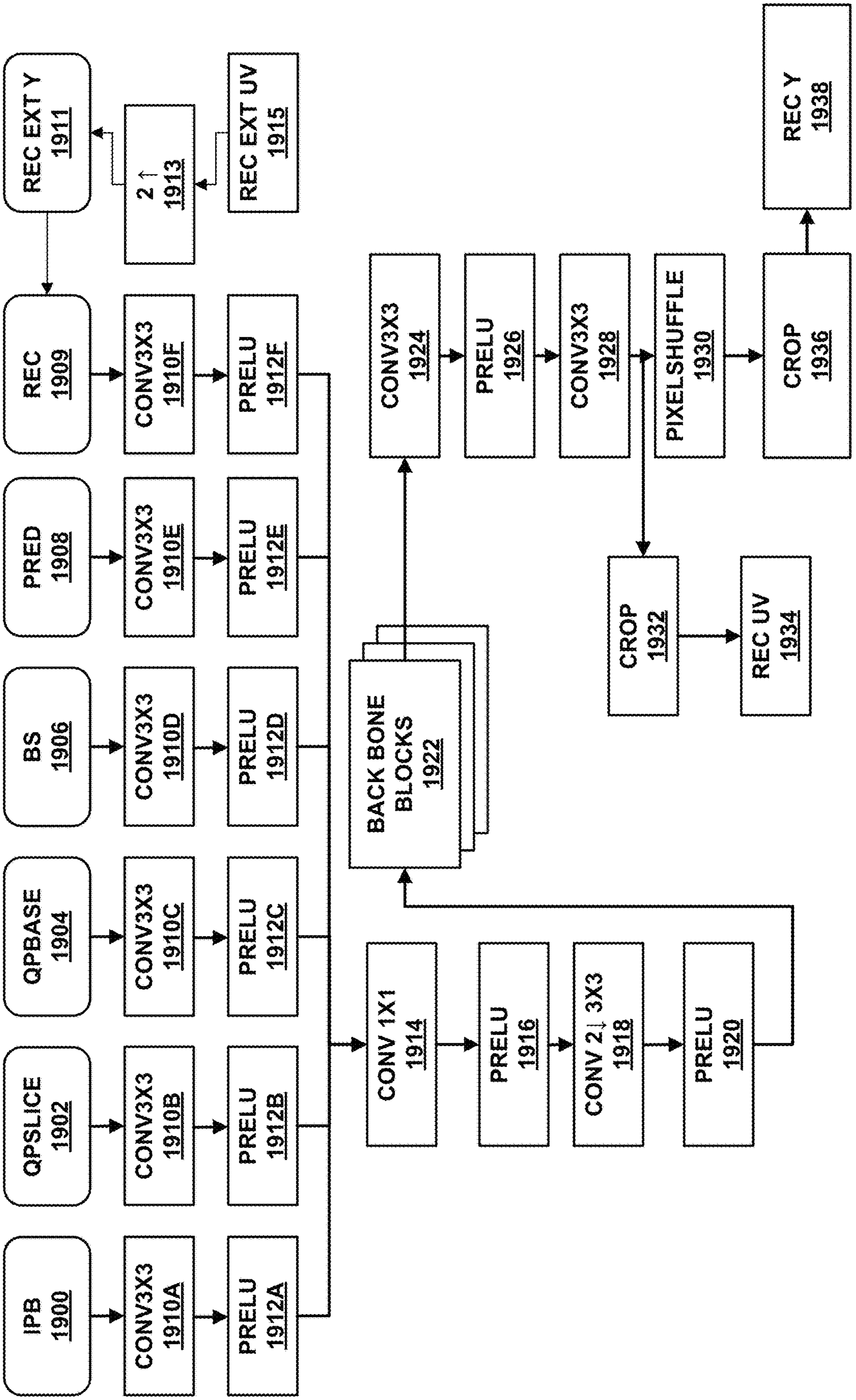
FIG. 19 is a conceptual diagram illustrating an example of a unified filter architecture.

FIG. 19 is a conceptual diagram illustrating an example of a unified filter architecture. Some of the CNN techniques and network components described above may be used in a Unified Loop Filter architecture. A single model may be trained for Y,Cb,Cr components and used for coding of both intra and inter coded pictures. FIG. 19 depicts an example of such a unified loop filter architecture.

The unified filter architecture of FIG. 19 includes 3×3 convolutional filters 1910A-1910F, PReLU modules 1912A-1912F, 1×1 convolutional filter 1914, PReLU module 1916, 2↓ 3×3 convolutional filter 1918, PReLU module 1920, back bone blocks 1922, 3×3 convolutional filter 1924, PReLU module 1926, 3×3 convolutional filter 1928, crop unit 1932, pixel shuffle unit 1930, and crop unit 1936. 3×3 convolutional filters 1910A-1910F receive respective inputs of IPB 1900, QPSlice 1902, QPBase 1904, boundary strength (BS) 1906, prediction 1908, rec 1909, rec ext luma (Y) 1911, 2 ↓ 1913, and rec ext chroma (UV) 1915. Crop unit 1932 outputs filtered reconstructed chroma (rec UV) 1934, and crop unit 1936 outputs reconstructed luma (rec Y) 1938.

Figure 20:
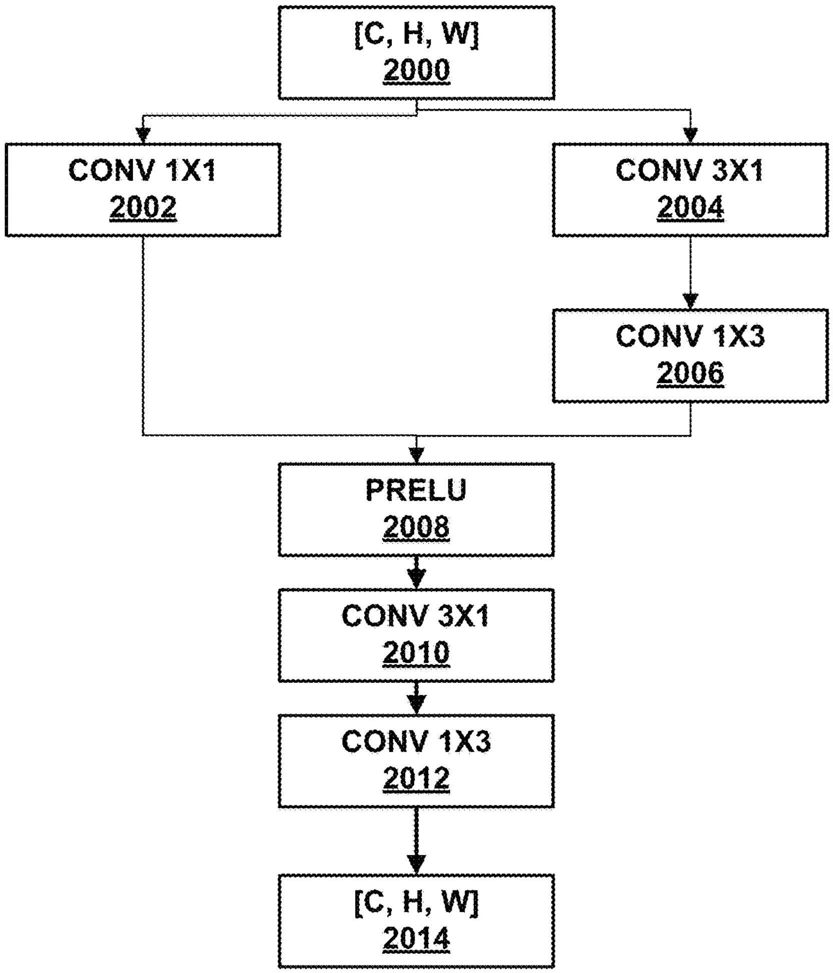
FIG. 20 is a block diagram illustrating an example back bone block per techniques of this disclosure.

FIG. 20 is a block diagram illustrating an example back bone block per techniques of this disclosure. Each of back bone blocks 1922 of FIG. 19 may include components similar to those of the back bone block of FIG. 20. In this example, the back bone block includes 1×1 convolutional filter 2002, 3×1 convolutional filter 3×1 2004, 1×3 convolutional filter 2006, PReLU module 2008, 3×1 convolutional filter 2010, and 1×3 convolutional filter 2012. 1×1 convolutional filter 2002 and 3×1 convolutional filter 3×1 2004 receive input in the form of coefficients and height and width values (C, H, W) 2000, and the back bone block outputs filtered data [C, H, W] 2014.

Figure 21A:
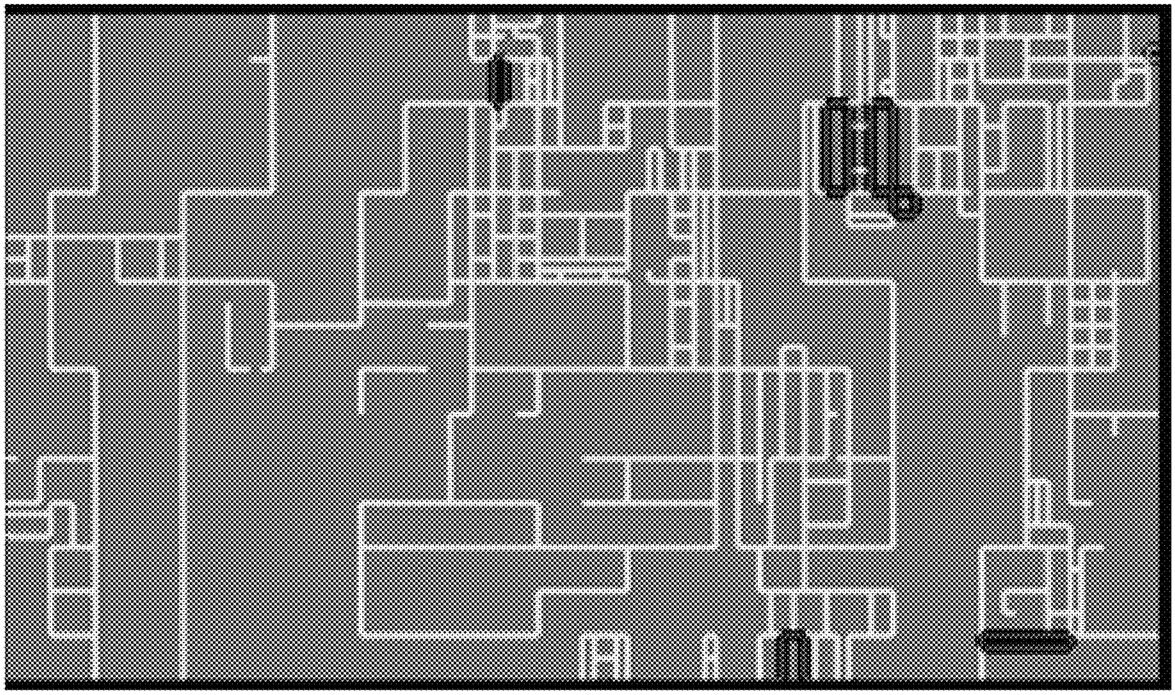
FIGS. 21A and 21B are conceptual diagrams illustrating examples of deblocking parameters (BS) (21A) for an image being processed (21B).
Figure 21B:
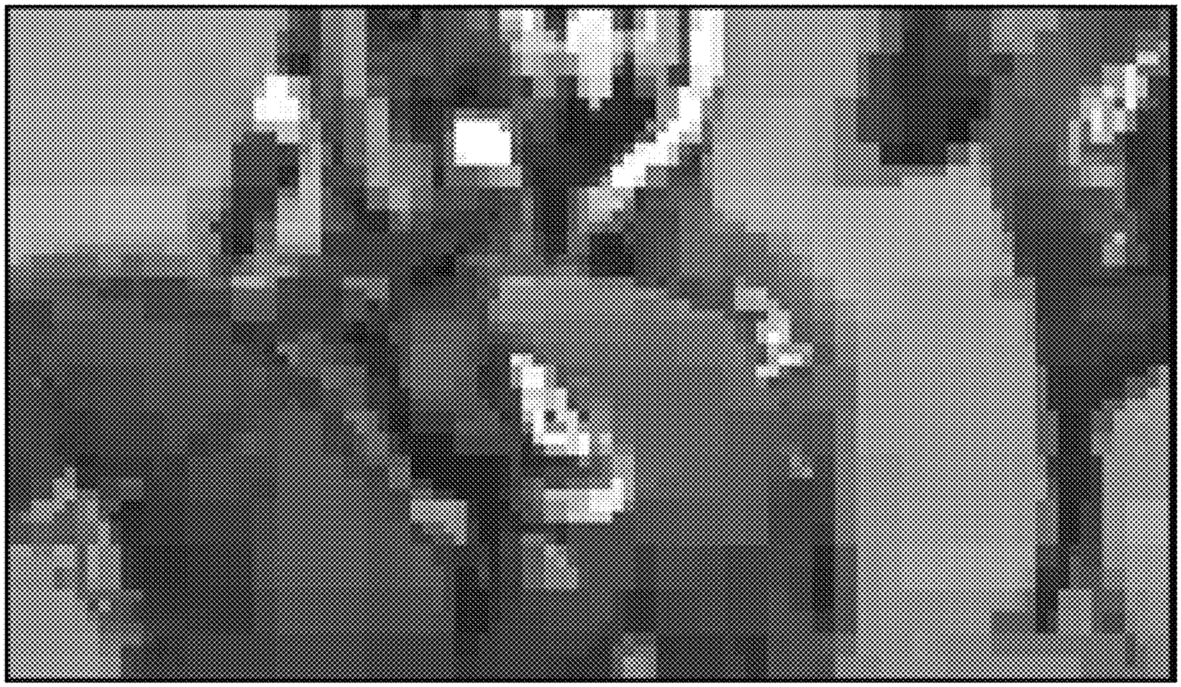

FIGS. 21A and 21B are conceptual diagrams illustrating examples of deblocking parameters (e.g., boundary strength, BS) (21A) for an image being processed (21B). Convolution with a 3×3 kernel is popular in CNN-based filters. In the architectures described above, a 3×3×N×M convolution is applied on the N-channel input data to generate equal-spatially-sized feature maps of M channels. If convolutions employ a stride of greater than one, a spatial downsampling can be incorporated. Equal block sizes are commonly used for all input data in these architectures so that initial feature maps can be easily concatenated for further joint processing.

With such a design, some types of data, e.g., QP parameters, BS, block partitioning information, or coding mode information, which are sparse given their pixel-wise data representation, or even a scalar value, may be replicated across input blocks. A visualization of such type of data is shown in FIGS. 21A and 21B.

Figure 22:
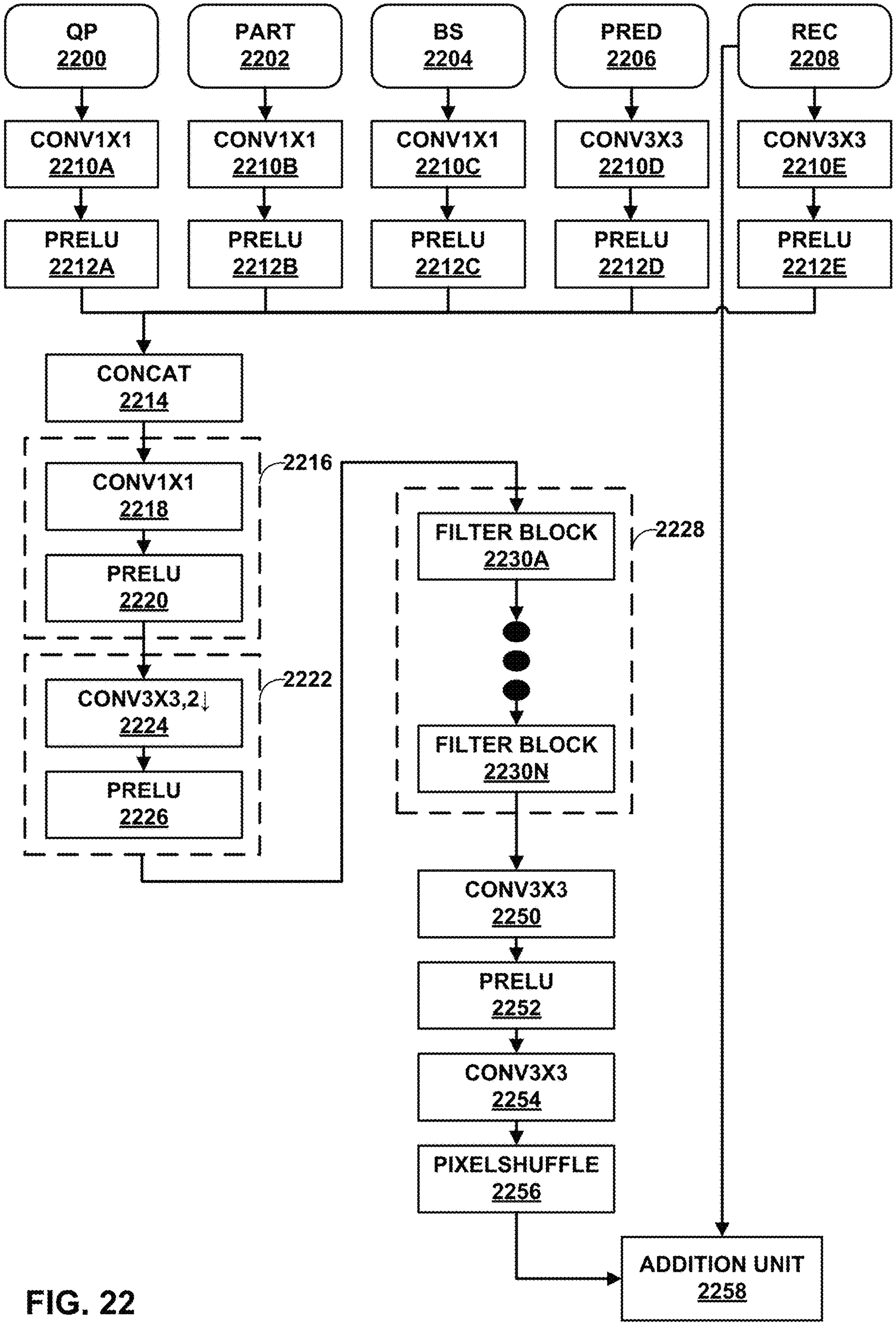
FIG. 22 is a conceptual diagram illustrating an example neural network architecture including select 1×1 convolutions instead of 3×3 convolutions.

FIG. 22 is a conceptual diagram illustrating an example neural network architecture including select 1×1 convolutions instead of 3×3 convolutions. A 3×3 convolution operating on such data may not be optimal. For replicated scalar data, e.g., QP for a video block, within a fragment, a convolution is unnecessarily computationally expensive, and for sparse data may ill-represent the data. For data with sparse representation, 3×3 spatial convolution can be replaced with point-wise convolution 1×1, as shown in the example of FIG. 22. In the resulting design, the dimension of the convoluted feature map will be identical to the original method. Complexity reduction by 9× for a respective feature extraction module is achieved by reducing filter support from nine spatial input samples to a single sample (1×1 kernel).

Thus, in this example, the NN architecture includes 1×1 convolutional filters 2210A-210C that filter respective inputs of QP 2200, partition (part) 2202, and boundary strength (BS) 2204. The architecture in this example includes 3×3 convolutional filters 2210D and 2210E that process, respectively, prediction 2206 and reconstruction 2208. The convolutional filters provide processed data to respective PReLU modules 2212A-2212E. PReLU modules 2212A-2212E output data to concatenation unit 2214, which provides concatenated data to fuse unit 2216, including 1×1 convolutional filter 2218 and PReLU module 2220. Fuse unit 2216 outputs data to transition unit 2222, including 3×3 2↓ convolutional filter 2224 and PReLU module 2226. Transition unit 2222 outputs processed data to filter blocks 2228 including filter block 2230A-2230N. 3×3 convolutional filter 2250 processes output of filter blocks 2228 and provides output to PReLU module 2252, which outputs to 3×3 convolutional filter 2254, which sends output to pixel shuffle unit 2256. Addition unit 2258 combines the output of pixel shuffle unit 2256 with rec 2208 to form filtered output.

Some CNN architectures conduct intendent feature extraction for all input types of data in a so-called head-block. Input data is processed in non-overlapped blocks H×W (with padding in some circumstances), with convolution, either 3×3×K or 1×1×K, with K being number of feature parameters being extracted from input data. In some examples, K may take an integer value, e.g., 16 or 64, with output of the input feature extraction module being a 3D volume size of H×W×K for each input. Each of these N output volumes undergoes PReLU non-linear processing and may be concatenated into a 3D volume of size H×W×(K*N), where N is the number of channels and the number of features being K for every type of input data. In some embodiments, input channels can have different numbers of features Ki. Thus, the resulting volume after concatenation would be H×W×(sum (Ki)), where Ki is number of features for each i-input, with i=0 . . . N−1.

In some cases, a large share (~60%) of resulting features volume will be extracted from sparse types of data, such as QP, partitioning information, and BS, with actual pixel data represented by 20% of features. Considering low entropy of supplementary data, such a high ratio of features of this type of data may be redundant for the amount of information represented by those channels.

Examples of supplementary data include:

CU/PU/TU partition information

Information of de-blocking filter. E.g., boundary strength of de-blocking filter process, long or short filter, strong or weak filter, etc.

Quantization parameters (QPs) used for the current picture/block and/or reference picture(s)

Intra/Inter mode information

Distance between the current picture and its reference picture(s).

E.g., use the difference between the POC of the current picture and the POC(s) of its reference picture(s) as the information.

Motion information of coded blocks

Depending on the CNN filter architecture, complexity of the headblock can be quite significant, e.g., 7% in the case of the UF architecture (FIG. 18) with 24 residual blocks, or 18% in the case of UF architecture with 8 residual blocks.

Figure 23:
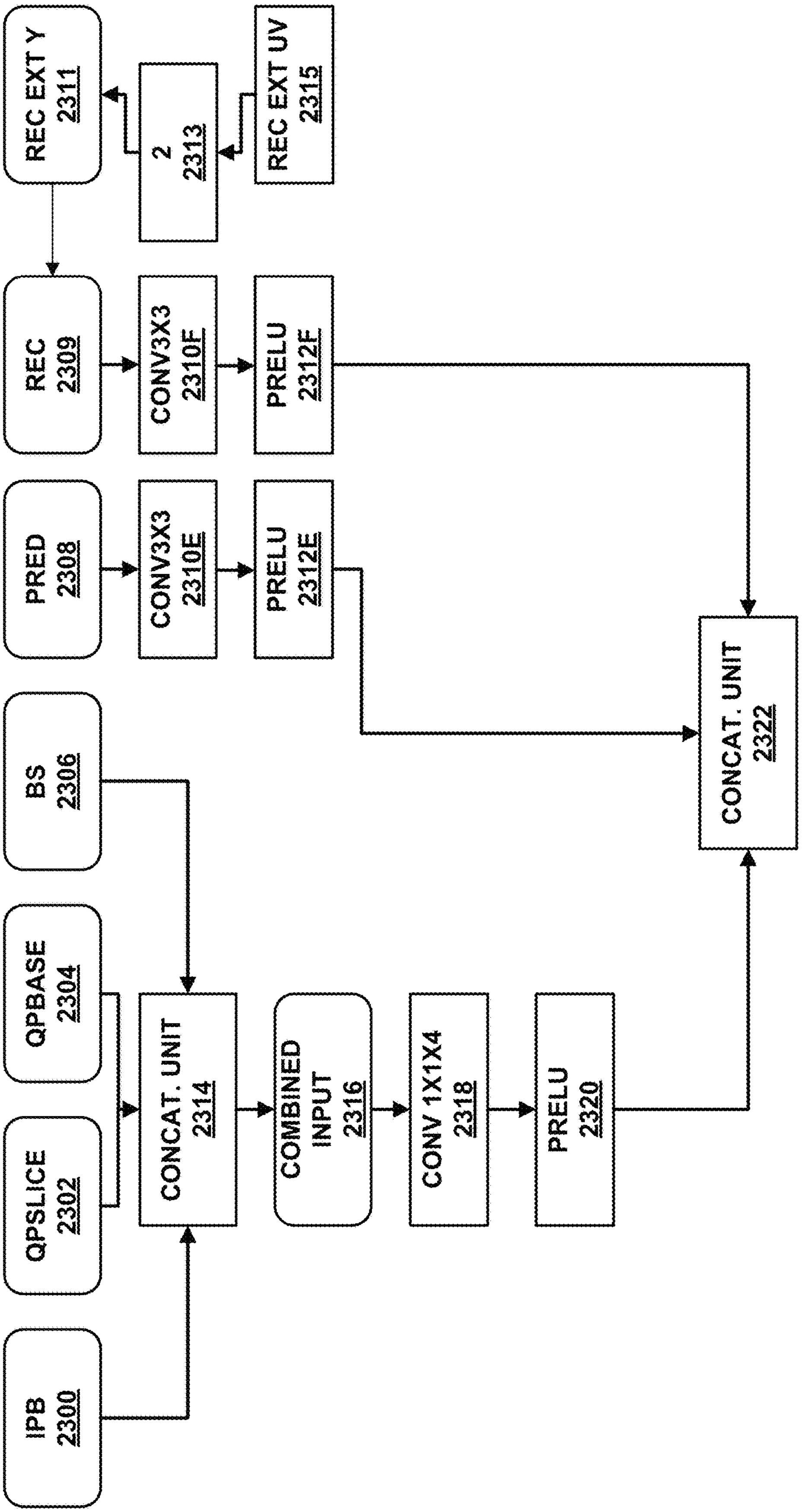
FIG. 23 is a conceptual diagram illustrating an example headblock of a unified filter (UF) architecture with supplementary data combined into a single output.

FIG. 23 is a conceptual diagram illustrating an example headblock of a unified filter (UF) architecture with supplementary data combined into a single output. To reduce the number of input channels, reduce required bandwidth and respectively reduce complexity of the CNN filter architecture, this disclosure describes techniques that include aggregating supplementary information from multiple sources into a single input.

In some examples, supplementary data from different sources, represented in 2D planes, can be concatenated plane-wise to form a 3D volume. This volume of supplementary data is processed jointly for feature extraction as shown in FIG. 23, with planes of QPBase 2304, QPSlice 2302, IPB 2300, and BS 2306 channels being provided to concatenation (concat.) unit 2314, which combines these inputs into a 3D volume of 4 planes, i.e., combined input 2316. Combined supplementary data is processed by 1×1×4 convolutional filter 2318, which performs depth-wise (1×1 convolution in spatial domain) convolution with d4 output channels. PReLU module 2320 receives and processes this d4 output.

Additionally, 3×3 convolutional filter 2310E and 3×3 convolutional filter 2310F receive prediction (pred) 2308 and reconstruction (rec) 2309, along with rec ext Y 2311, 2 2313, and rec ext UV 2315. PReLU 2312E and PReLU 2312F process the convolved data and provide output to concatenation unit 2322, which also receives data from PReLU 2320, and forms filtered output.

In some examples, supplementary data from different sources, represented by 2D plane(s), can be concatenated into a single 2D plane: $\text{Plane}_{comb}$ through a combination of linear and/or non-linear operations for each pixel sample position (i,j) in every $\text{Plane}_a$, $\text{Plane}_b$, . . . selected for combination:

$$\text{Plane}_{comb}(i, j) = \text{function}(\text{Plane}_a(i, j), \text{Plane}_b(i, j), \ldots) \tag{4}$$

An example of such a function is:

$$\text{Plane}_{combined}(i, j) = A1 * QPBase(i, j)/A2 + B1 * BS(i, j)/B2 \tag{5}$$

In equation (5), A2 and B2 are normalizing factors for QPBase and BS original dynamical ranges, and A1 and B1 are weight factors renormalizing results for dynamic range of the $\text{Plane}_{comb}$, optimal for CNN feature extraction. Equation 5 can be followed by a non-linear operation of clipping, MIN/MAX, or others to ensure the value falls in the dynamical range, e.g., 0 . . . $2^{10}-1$ for 10 bits data representation, or its normalized floating point representation.

In some examples, operations of equation (5) can be extended to larger number of input planes, e.g., IPB or QPSlice. In some examples, operations of equation (5), can be conducted independently for input color components Y, Cb, Cr if independent input is available for each plane. Alternatively, some information available in a single plane only, e.g., IPB, can be replicated to be utilized to produce combined planes for each of the Y,Cb,Cr planes.

In some examples, spatial dimension adjustments, such as upsampling, downsampling or padding can be applied for planes prior to combining them toward a target dimensions.

Figure 24:
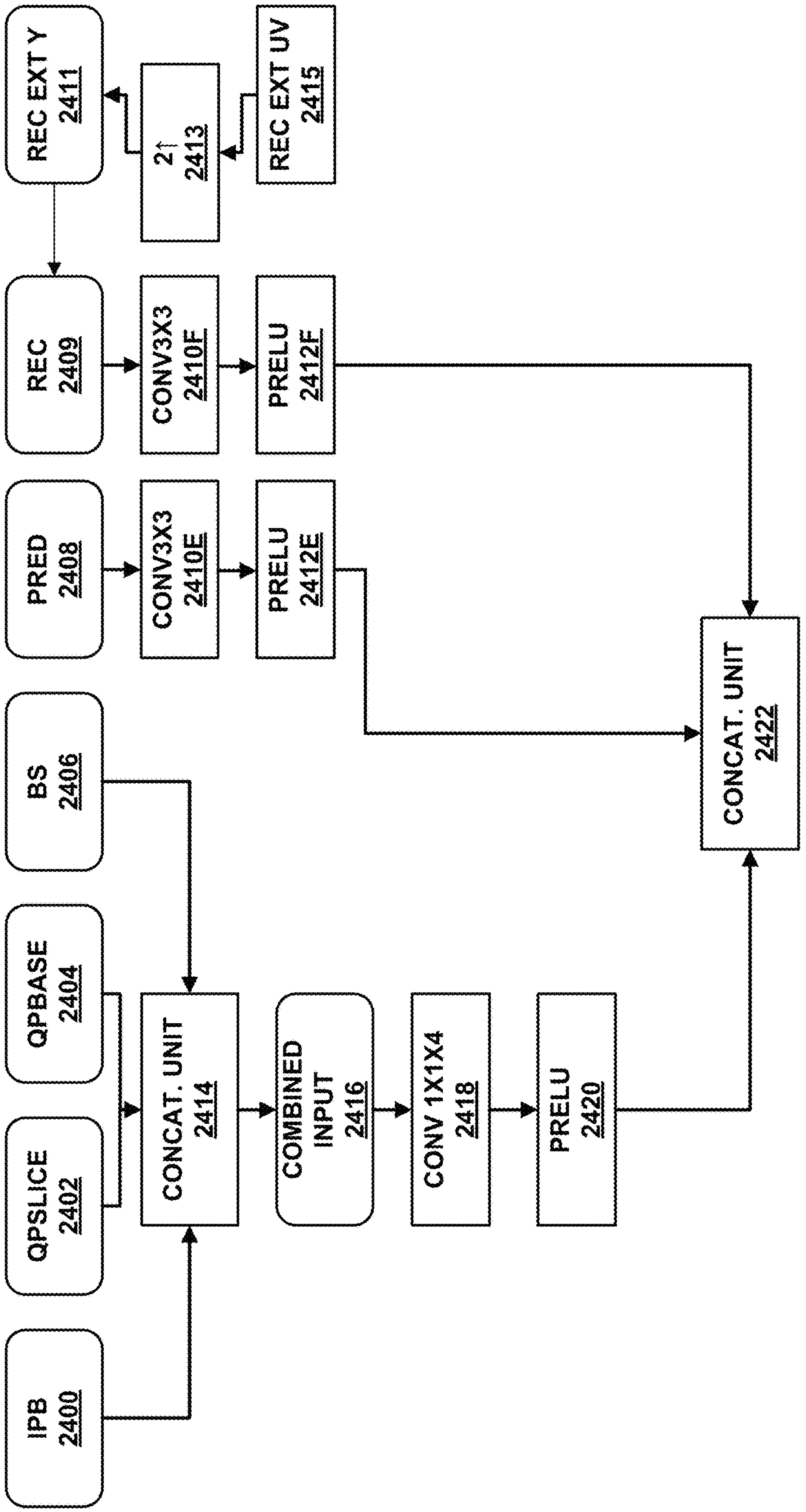
FIG. 24 is a conceptual diagram illustrating an example neural network architecture with supplementary data combined into a single plane through an aggregation function.

FIG. 24 is a conceptual diagram illustrating an example neural network architecture with supplementary data combined into a single plane through an aggregation function performed by concatenation unit 2414. That is, concatenation unit 2414 receives IPB 2400, QPSlice 2402, QPBase 2404, and BS 2406 and generates combined input 2416. In some examples, the aggregation function may be:

$$\text{Plane}_{comb}(i, j) = A1 * (QPSlice(i, j) - QPBase(i, j))/A2 + B1 * QPBase(i, j)/B2 + C1 * BS(i, j)/C2 \tag{6}$$

In some examples, choice of weighting factors A1, B1, C2, . . . and/or their respective renormalized factors, as shown in equation (6), is motivated by the entropy of the associated input. Examples of factors for QPBase channel include A1=15, A2=64, and factors for BS are B1=4 and B2=2.

1×1×4 convolutional filter 2418 may then process combined input 2418, and PReLU module 2420 processes the output of 1×1×4 convolutional filter 2418. Additionally, 3×3 convolutional filter 2410E and 3×3 convolutional filter 2410F receive prediction (pred) 2408 and reconstruction (rec) 2409, along with rec ext Y 2411, 2↑ 2413, and rec ext UV 2415. PReLU 2412E and PReLU 2412F process the convolved data and provide output to concatenation unit 2422, which also receives data from PReLU 2420, and forms filtered output.

Figure 25:
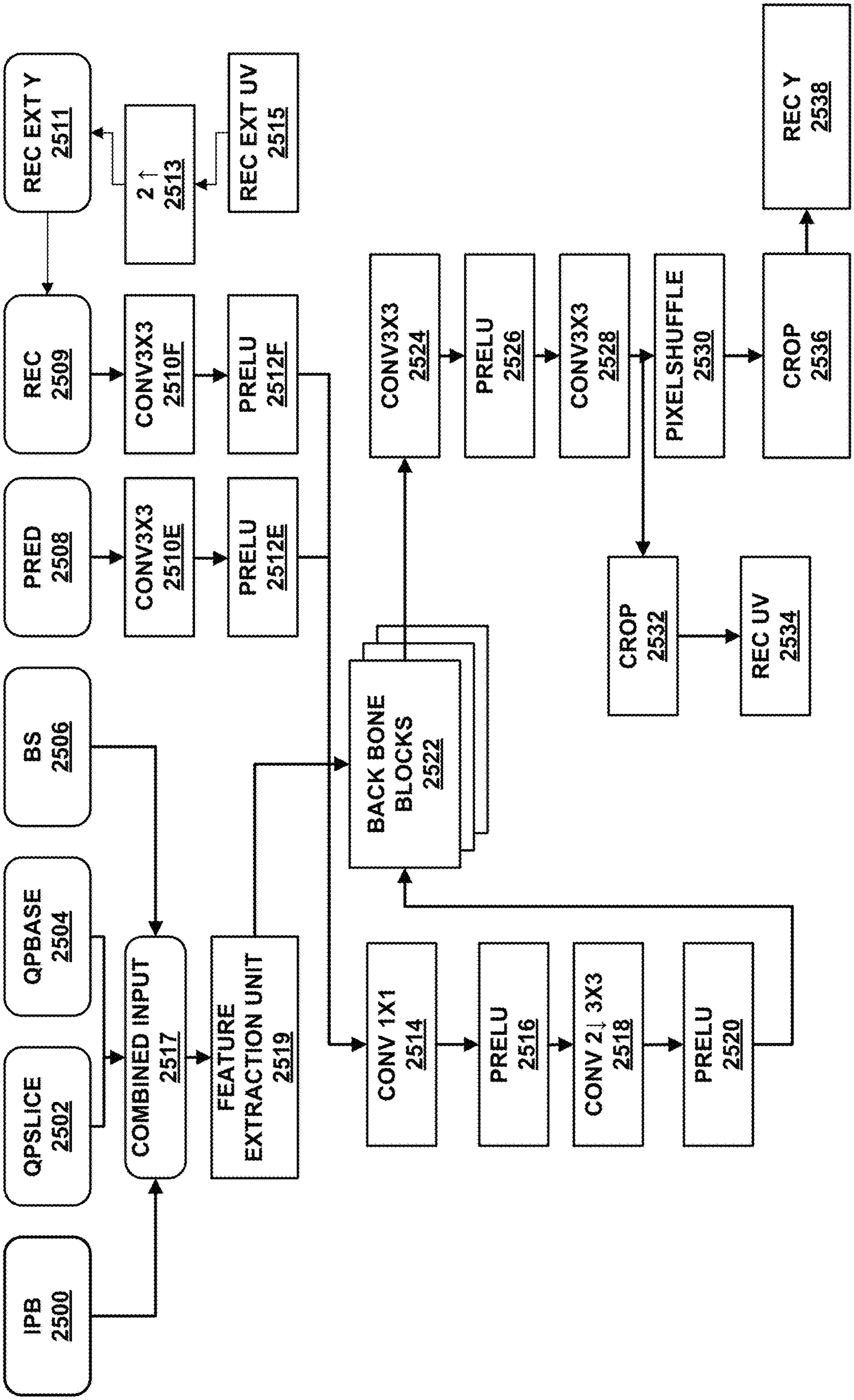
FIG. 25 is a conceptual diagram illustrating an example neural network architecture with supplementary data combined into a single plane through an aggregation function and that undergoes a reduced complexity processing flow.

FIG. 25 is a conceptual diagram illustrating an example neural network architecture with supplementary data combined into a single plane through an aggregation function and that undergoes a reduced complexity processing flow. In some examples, unified supplementary data input can undergo separately defined feature extraction process, different from pixel-based data. For example, certain processing stages can be omitted, or reduced number of residual blocks of UF architecture applied, for features of the supplementary data, as shown in FIG. 25.

In particular, in this example, various supplementary inputs, such as IPB 2500, QPSlice 2502, QPBase 2504, and/or BS 2506, may be combined into combined input 2517. Feature extraction unit 2519 may process combined input 2517 to extract features to be used by back bone blocks 2522. Additionally, 3×3 convolution filter 2510E processes prediction (pred) 2508 and passes data to PReLU module 2512E, while 3×3 convolutional filter 2510F processes rec 2509 (including rec ext Y 2511, 2↑ 2513, and rex ext UV 2515, and passes data to PReLU module 2512F. PReLU modules 2512E and 2512F pass filtered data to 1×1 convolutional filter 2514, which passes processed data to PReLU 2516. Then 2↓ 3×3 convolutional filter 2518 processes the output of PReLU 2516 and passes output data to PReLU 2520, which passes data to back bone blocks 2522. Back bone blocks 2522 may be configured similarly to the example back bone block of FIG. 20. Back bone blocks pass processed data to 3×3 convolutional filter 2524, which processes the data and passes output data to PReLU 2526.

This data is passed to 3×3 convolutional filter 2528, which passes output to crop unit 2532 and pixel shuffle unit 2530. Crop unit 2532 forms filtered, cropped output data in the form of rec UV 2534. Pixel shuffle unit 2530 passes data to crop unit 2536, which forms output data in the form of rec Y 2538.

Figure 26:
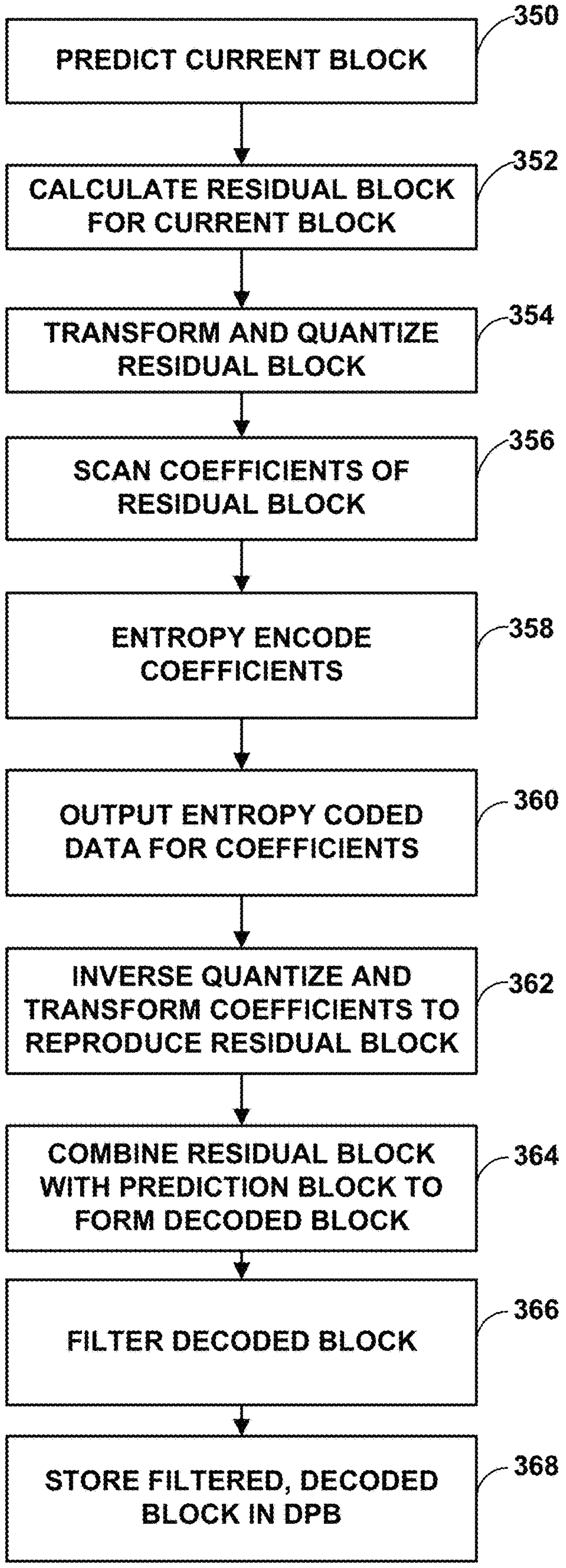
FIG. 26 is a flowchart illustrating an example method for encoding a current block in accordance with the techniques of this disclosure.

FIG. 26 is a flowchart illustrating an example method for encoding a current block in accordance with the techniques of this disclosure. The current block may comprise a current CU. Although described with respect to video encoder 200 (FIGS. 1 and 4), it should be understood that other devices may be configured to perform a method similar to that of FIG. 26.

In this example, video encoder 200 initially predicts the current block (350). For example, video encoder 200 may form a prediction block for the current block. Video encoder

200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then filter the decoded block according to the techniques of this disclosure (366). For example, video encoder 200 may combine two or more sets of supplemental data into a single set of supplementary data and then use the block and the single set of supplementary data as inputs to a CNN to filter the block. In some examples, video encoder 200 may decode two or more blocks (e.g., an entire tile, slice, or picture) prior to filtering in this manner. Ultimately, video encoder 200 may store the filtered, decoded block(s) in DPB 218 (368).

In this manner, the method of FIG. 26 represents an example of a method of decoding video data including decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture.

Figure 27:
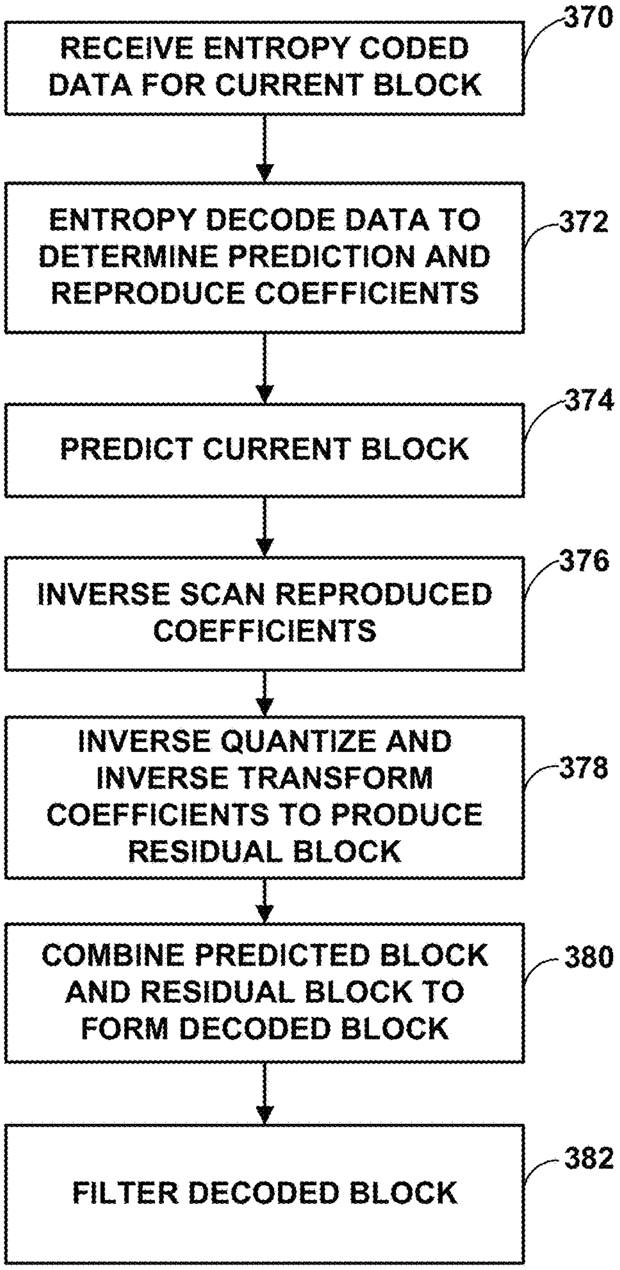
FIG. 27 is a flowchart illustrating an example method for decoding a current block in accordance with the techniques of this disclosure.

FIG. 27 is a flowchart illustrating an example method for decoding a current block of video data in accordance with the techniques of this disclosure. The current block may comprise a current CU. Although described with respect to video decoder 300 (FIGS. 1 and 5), it should be understood that other devices may be configured to perform a method similar to that of FIG. 27.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block to form a decoded block (380).

Video decoder 300 may furthermore filter the decoded block using the techniques of this disclosure (382). For example, video decoder 300 may combine two or more sets of supplemental data into a single set of supplementary data and then use the block and the single set of supplementary data as inputs to a CNN to filter the block. In some examples, video decoder 300 may decode two or more blocks (e.g., an entire tile, slice, or picture) prior to filtering in this manner.

In this manner, the method of FIG. 27 represents an example of a method of decoding video data including decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture.

Figure 28:
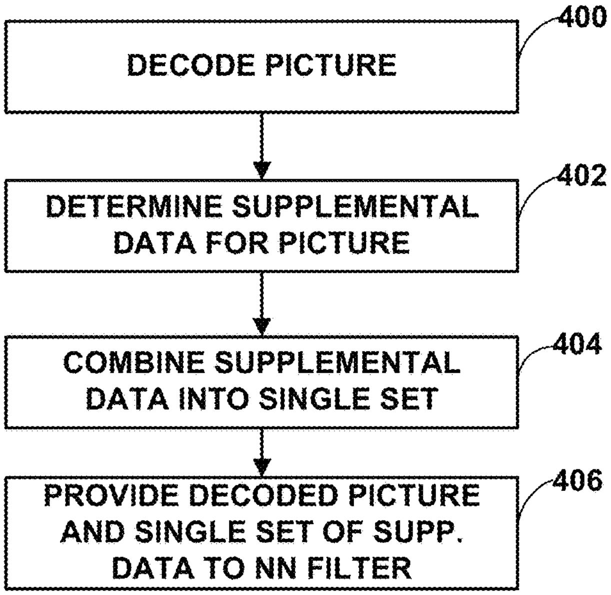
FIG. 28 is a flowchart illustrating an example method of decoding and filtering video data according to techniques of this disclosure.

FIG. 28 is a flowchart illustrating an example method of decoding and filtering video data according to techniques of this disclosure. Initially, a video decoder (such as video decoder 300) may decode all or a portion of a picture of video data (400). The video decoder may output the decoded picture along with supplemental data for the picture, such as boundary strength (BS) data, partition (part) data, prediction data, quantization data (such as a quantization base and/or quantization slice value), or other such data. The video decoder (or another unit, such as a pre-processing or filtering unit) may thus determine the supplemental data for the picture (402) and combine two or more sets of supplemental data into a single set of input supplemental data (404) per the techniques of this disclosure. The video decoder (or pre-processing unit) may provide the decoded picture and the single set of supplemental input data to a neural network based filter (406), which may filter the picture using the single set of supplemental input data, per the techniques of this disclosure.

In this manner, the method of FIG. 28 represents an example of a method of decoding video data, including: decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture.

Various examples of the techniques of this disclosure are summarized in the following clauses:

Clause 1: A method of decoding video data, the method comprising: decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture.

Clause 2: The method of clause 1, wherein each of the sets of supplementary data corresponds to a respective two-dimensional plane, and wherein combining the two or more sets of supplementary data comprises concatenating each of the two-dimensional planes into a three-dimensional volume.

Clause 3: The method of clause 1, wherein each of the sets of supplementary data corresponds to a respective two-dimensional plane, and wherein combining the two or more sets of supplementary data comprises combining each of the two-dimensional planes into a single two-dimensional plane.

Clause 4: The method of clause 3, wherein combining each of the two-dimensional planes comprises mathematically combining co-located values for each pixel sample position from each of the two-dimensional planes.

Clause 5: The method of clause 4, wherein mathematically combining the co-located values comprises calculating $Plane_{comb}(i,j)=function(Plane_a(i,j), Plane_b(i,j), \ldots, Plane_n(i,j))$.

Clause 6: The method of clause 4, wherein mathematically combining the co-located values comprises calculating $Plane_{combined}(i,j)=A1*QPBase(i,j)/A2+B1*BS(i,j)/B2$, wherein A1 and B1 are weight factors, A2 and B2 are normalizing factors, and the two-dimensional planes include a quantization parameter (QP) base plane and a boundary strength (BS) plane.

Clause 7: The method of clause 4, wherein mathematically combining the co-located values comprises calculating $Plane_{comb}(i,j)=A1*(QPSlice(i,j)-QPBase(i,j))/A2+B1*QPBase(i,j)/B2+C1*BS(i,j)/C2$.

Clause 8: The method of any of clauses 3-7, further comprising performing one or more operations on values of the single two-dimensional plane.

Clause 9: The method of clause 8, wherein the one or more operations include one or more of a clipping operation, a minimum operation, or a maximum operation.

Clause 10: The method of any of clauses 2-9, further comprising performing one or more spatial dimension adjustments to the two or more two-dimensional input planes prior to combining the two-dimensional input planes.

Clause 11: The method of clause 10, wherein the spatial dimension adjustments include one or more of upsampling, downsampling, or padding.

Clause 12: The method of any of clauses 1-11, further comprising performing a feature extraction process on one or more of the two or more sets of supplementary data prior to combining the two or more sets of supplementary data.

Clause 13: The method of any of clauses 1-12, wherein the supplementary data includes one or more of coding unit (CU) partition information, prediction unit (PU) partition information, transform unit (TU) partition information, deblocking filter information, boundary strength (BS) information, long or short deblocking filter information, strong or weak deblocking filter information, quantization parameters (QPs), intra-prediction information, inter-prediction information, distance between the picture and a reference picture for the picture, or motion information of coded blocks of the picture.

Clause 14: The method of any of clauses 1-13, further comprising encoding the current block prior to decoding the current block.

Clause 15: A device for decoding video data, the device comprising one or more means for performing the method of any of clauses 1-14.

Clause 16: The device of clause 15, wherein the one or more means comprise a processing system comprising one or more processors implemented in circuitry.

Clause 17: The device of any of clauses 15 and 16, further comprising a display configured to display the decoded video data.

Clause 18: The device of any of clauses 15-17, wherein the device comprises one or more of a camera, a computer, a mobile device, a broadcast receiver device, or a set-top box.

Clause 19: The device of clause 15-18, further comprising a memory configured to store the video data.

Clause 20: A computer-readable storage medium having stored thereon instructions that, when executed, cause a processor of a device for decoding video data to perform the method of any of clauses 1-14.

Clause 21: A device for decoding video data, the device comprising: means for decoding at least a portion of a picture of video data; means for combining two or more sets of supplementary data for the at least portion of the picture into a single set of supplementary data; and means for executing a neural network filter, using the at least portion of the picture and the single set of supplementary data as inputs to the neural network filter, to filter the at least portion of the picture.

Clause 22: A method of decoding video data, the method comprising: decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture.

Clause 23: The method of clause 22, wherein each of the sets of supplementary data corresponds to a respective two-dimensional plane, and wherein combining the two or more sets of supplementary data comprises concatenating each of the two-dimensional planes into a three-dimensional volume.

Clause 24: The method of clause 22, wherein each of the sets of supplementary data corresponds to a respective two-dimensional plane, and wherein combining the two or more sets of supplementary data comprises combining each of the two-dimensional planes into a single two-dimensional plane.

Clause 25: The method of clause 24, wherein combining each of the two-dimensional planes comprises mathematically combining co-located values for each pixel sample position from each of the two-dimensional planes.

Clause 26: The method of clause 25, wherein mathematically combining the co-located values comprises calculating $Plane_{comb}(i,j)=function(Plane_a(i,j), Plane_b(i,j), \ldots, Plane_n(i,j))$.

Clause 27: The method of clause 25, wherein mathematically combining the co-located values comprises calculating $Plane_{combined}(i,j)=A1*QPBase(i,j)/A2+B1*BS(i,j)/B2$, wherein A1 and B1 are weight factors, A2 and B2 are normalizing factors, and the two-dimensional planes include a quantization parameter (QP) base plane and a boundary strength (BS) plane.

Clause 28: The method of clause 25, wherein mathematically combining the co-located values comprises calculating $Plane_{comb}(i,j)=A1*(QPSlice(i,j)-QPBase(i,j))/A2+B1*QPBase(i,j)/B2+C1*BS(i,j)/C2$.

Clause 29: The method of clause 24, further comprising performing one or more operations on values of the single two-dimensional plane.

Clause 30: The method of clause 29, wherein the one or more operations include one or more of a clipping operation, a minimum operation, or a maximum operation.

Clause 31: The method of clause 23, further comprising performing one or more spatial dimension adjustments to the two or more two-dimensional input planes prior to combining the two-dimensional input planes.

Clause 32: The method of clause 31, wherein the spatial dimension adjustments include one or more of upsampling, downsampling, or padding.

Clause 33: The method of clause 22, further comprising performing a feature extraction process on one or more of the two or more sets of supplementary data prior to combining the two or more sets of supplementary data.

Clause 34: The method of clause 22, wherein the supplementary data includes one or more of coding unit (CU) partition information, prediction unit (PU) partition information, transform unit (TU) partition information, deblocking filter information, boundary strength (BS) information, long or short deblocking filter information, strong or weak deblocking filter information, quantization parameters (QPs), intra-prediction information, inter-prediction information, distance between the picture and a reference picture for the picture, or motion information of coded blocks of the picture.

Clause 35: The method of clause 22, further comprising encoding the current block prior to decoding the current block.

Clause 36: A method of decoding video data, the method comprising: decoding at least a portion of a picture of video data; combining two or more sets of supplementary data for the at least portion of the picture into a single set of supplementary data; and executing a neural network filter, using the at least portion of the picture and the single set of supplementary data as inputs to the neural network filter, to filter the at least portion of the picture.

Clause 37: The method of clause 36, wherein each of the sets of supplementary data corresponds to a respective two-dimensional plane, and wherein combining the two or more sets of supplementary data comprises concatenating each of the two-dimensional planes into a three-dimensional volume.

Clause 38: The method of clause 36, wherein each of the sets of supplementary data corresponds to a respective two-dimensional plane, and wherein combining the two or more sets of supplementary data comprises combining each of the two-dimensional planes into a single two-dimensional plane.

Clause 39: The method of clause 38, wherein combining each of the two-dimensional planes comprises mathematically combining co-located values for each pixel sample position from each of the two-dimensional planes.

Clause 40: The method of clause 39, wherein mathematically combining the co-located values comprises calculating Plane_comb (i,j)=function(Plane_a (i,j), Plane_b (i,j), . . . , 〚Plane〛 _n (i,j)).

Clause 41: The method of clause 39, wherein mathematically combining the co-located values comprises calculating Plane_combined (i,j)=A1*QPBase(i,j)/A2+B1*BS(i,j)/B2, wherein A1 and B1 are weight factors, A2 and B2 are normalizing factors, and the two-dimensional planes include a quantization parameter (QP) base plane and a boundary strength (BS) plane.

Clause 42: The method of clause 39, wherein mathematically combining the co-located values comprises calculating Plane_comb (i,j)=A1*(QPSlice (i,j)−QPBase (i,j))/A2+B1*QPBase(i,j)/B2+C1*BS(i,j)/C2.

Clause 43: The method of clause 38, further comprising performing one or more operations on values of the single two-dimensional plane.

Clause 44: The method of clause 43, wherein the one or more operations include one or more of a clipping operation, a minimum operation, or a maximum operation.

Clause 45: The method of clause 38, further comprising performing one or more spatial dimension adjustments to the two or more two-dimensional input planes prior to combining the two-dimensional input planes.

Clause 46: The method of clause 45, wherein the spatial dimension adjustments include one or more of upsampling, downsampling, or padding.

Clause 47: The method of clause 36, further comprising performing a feature extraction process on one or more of the two or more sets of supplementary data prior to combining the two or more sets of supplementary data.

Clause 48: The method of clause 36, wherein the supplementary data includes one or more of coding unit (CU) partition information, prediction unit (PU) partition information, transform unit (TU) partition information, deblocking filter information, boundary strength (BS) information, long or short deblocking filter information, strong or weak deblocking filter information, quantization parameters (QPs), intra-prediction information, inter-prediction information, distance between the picture and a reference picture for the picture, or motion information of coded blocks of the picture.

Clause 49: The method of clause 36, further comprising encoding the at least portion of the picture prior to decoding the at least portion of the picture.

Clause 50: A device for decoding video data, the device comprising: a memory configured to store video data; and a processing system comprising one or more processors implemented in circuitry, the processing system being configured to: decode at least a portion of a picture of video data; combine two or more sets of supplementary data for the at least portion of the picture into a single set of supplementary data; and execute a neural network filter, using the at least portion of the picture and the single set of supplementary data as inputs to the neural network filter, to filter the at least portion of the picture.

Clause 51: The device of clause 50, wherein each of the sets of supplementary data corresponds to a respective two-dimensional plane, and wherein combining the two or more sets of supplementary data comprises one of: concatenating each of the two-dimensional planes into a three-dimensional volume; or combining each of the two-dimensional planes into a single two-dimensional plane.

Clause 52: The device of clause 50, wherein the processing system is further configured to perform a feature extraction process on one or more of the two or more sets of supplementary data prior to combining the two or more sets of supplementary data.

Clause 53: The device of clause 50, wherein the supplementary data includes one or more of coding unit (CU) partition information, prediction unit (PU) partition information, transform unit (TU) partition information, deblocking filter information, boundary strength (BS) information, long or short deblocking filter information, strong or weak deblocking filter information, quantization parameters (QPs), intra-prediction information, inter-prediction information, distance between the picture and a reference picture for the picture, or motion information of coded blocks of the picture.

Clause 54: The device of clause 50, further comprising a display configured to display the picture.

Clause 55: The device of clause 50, wherein the device comprises one or more of a camera, a computer, a mobile device, a broadcast receiver device, or a set-top box.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

decoding data for at least a portion of a picture of video data;

deriving, from the decoded data for the at least portion of the picture, a set of pixels for the at least portion of the picture and two or more sets of supplementary data, the two or more sets of supplementary data being separate from the pixels;

combining the two or more sets of supplementary data for the at least portion of the picture into a single set of supplementary data, wherein each of the sets of supplementary data corresponds to a respective two-dimensional plane, wherein combining the two or more sets of supplementary data comprises combining each of the two-dimensional planes into a single two-dimensional plane, wherein combining each of the two-dimensional planes comprises combining co-located values for each pixel sample position from each of the two-dimensional planes, wherein the two or more sets of supplementary data comprise $Plane_a$, $Plane_b$, . . . $Plane_n$, and wherein combining the co-located values comprises calculating $Plane_{comb}$ (i,j)=A1*(QPSlice(i,j)−QPBase(i,j)/A2+B1*QPBase (i,j)/B2+C1*BS(i,j)/C2; and executing a neural network filter, using the at least portion of the picture and the single set of supplementary data as inputs to the neural network filter, to filter the pixels for the at least portion of the picture.

2. The method of claim 1, wherein each of the sets of supplementary data corresponds to a respective two-dimensional plane, and wherein combining the two or more sets of supplementary data comprises concatenating each of the two-dimensional planes into a three-dimensional volume.

3. The method of claim 1, wherein combining the co-located values comprises calculating a weighted sum of co-located values of the supplementary data.

4. The method of claim 1, further comprising performing one or more operations on values of the single two-dimensional plane.

5. The method of claim 4, wherein the one or more operations include one or more of a clipping operation, a minimum operation, or a maximum operation.

6. The method of claim 1, further comprising performing one or more spatial dimension adjustments to the two or more two-dimensional input planes prior to combining the two-dimensional input planes.

7. The method of claim 6, wherein the spatial dimension adjustments include one or more of upsampling, downsampling, or padding.

8. The method of claim 1, further comprising performing a feature extraction process on one or more of the two or more sets of supplementary data prior to combining the two or more sets of supplementary data.

9. The method of claim 1, wherein the supplementary data includes one or more of coding unit (CU) partition information, prediction unit (PU) partition information, transform unit (TU) partition information, deblocking filter information, boundary strength (BS) information, long or short deblocking filter information, strong or weak deblocking filter information, quantization parameters (QPs), intra-prediction information, inter-prediction information, distance between the picture and a reference picture for the picture, or motion information of coded blocks of the picture.

10. The method of claim 1, further comprising encoding the at least portion of the picture prior to decoding the at least portion of the picture.

11. A device for decoding video data, the device comprising:

a memory configured to store video data; and a processing system comprising one or more processors implemented in circuitry, the processing system being configured to:

decode at least a portion of a picture of video data;

derive, from the decoded data for the at least portion of the picture, a set of pixels for the at least portion of the picture and two or more sets of supplementary data, the two or more sets of supplementary data being separate from the pixels;

combine the two or more sets of supplementary data for the at least portion of the picture into a single set of supplementary data, wherein each of the sets of supplementary data corresponds to a respective two-dimensional plane, wherein to combine the two or more sets of supplementary data, and wherein the processing system is further configured to combine each of the two-dimensional planes into a single two-dimensional plane by combining co-located values for each pixel sample position from each of the two-dimensional planes, wherein the two or more sets of supplementary data comprise $Plane_a$, $Plane_b$, . . . $Plane_n$, and wherein to combine the co-located values, the processing system is configured to calculate $Plane_{comb}(i,j)=A1*(QPSlice(i,j)-QPBase(i,j))/A2+B1*QPBase(i,j)/B2+C1*BS(i,j)/C2$; and execute a neural network filter, using the at least portion of the picture and the single set of supplementary data as inputs to the neural network filter, to filter the at least portion of the picture.

12. The device of claim 11, wherein each of the sets of supplementary data corresponds to a respective two-dimensional plane, and wherein to combine the two or more sets of supplementary data, the processing system is configured to one of:

concatenate each of the two-dimensional planes into a three-dimensional volume; or combine each of the two-dimensional planes into a single two-dimensional plane.

13. The device of claim 11, wherein the processing system is further configured to perform a feature extraction process on one or more of the two or more sets of supplementary data prior to combining the two or more sets of supplementary data.

14. The device of claim 11, wherein the supplementary data includes one or more of coding unit (CU) partition information, prediction unit (PU) partition information, transform unit (TU) partition information, deblocking filter information, boundary strength (BS) information, long or short deblocking filter information, strong or weak deblocking filter information, quantization parameters (QPs), intra-prediction information, inter-prediction information, distance between the picture and a reference picture for the picture, or motion information of coded blocks of the picture.

15. The device of claim 11, further comprising a display configured to display the picture.

16. The device of claim 11, wherein the device comprises one or more of a camera, a computer, a mobile device, a broadcast receiver device, or a set-top box.

* * * * *